(12) United States Patent
Leger et al.

(10) Patent No.: US 11,163,168 B2
(45) Date of Patent: Nov. 2, 2021

(54) MANAGING ELECTROMAGNETIC FIELD PROPAGATION IN GRADIENT-INDEX MEDIA

(71) Applicant: Regents of the University of Minnesota, Minneapolis, MN (US)

(72) Inventors: James Robert Leger, Minneapolis, MN (US); William Minster Kunkel, Minneapolis, MN (US); Di Lin, Minneapolis, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 518 days.

(21) Appl. No.: 16/003,315

(22) Filed: Jun. 8, 2018

(65) Prior Publication Data
US 2018/0356642 A1   Dec. 13, 2018

Related U.S. Application Data

(60) Provisional application No. 62/517,779, filed on Jun. 9, 2017.

(51) Int. Cl.
*G02B 27/09* (2006.01)
*G02B 3/00* (2006.01)
(Continued)

(52) U.S. Cl.
CPC ....... *G02B 27/0955* (2013.01); *G02B 3/0087* (2013.01); *G02B 19/0004* (2013.01);
(Continued)

(58) Field of Classification Search
CPC ........... G02B 19/0004; G02B 19/0047; G02B 19/0052; G02B 27/0012; G02B 27/0927; G02B 27/0955; G02B 3/0087
(Continued)

(56) References Cited

U.S. PATENT DOCUMENTS 5,244,371 A * 9/1993 Bello .................. B01F 13/0059
                                                    425/130
7,643,719 B1 * 1/2010 Zhou ..................... G02B 3/0087
                                                    385/131
(Continued)

OTHER PUBLICATIONS

Beliakov and Chan, "Analysis of inhomogeneous optical systems by the use of ray tracing," Appl. Opt., 36(22):5303-5309, Aug. 1997.
(Continued)

*Primary Examiner* — John H Le
(74) *Attorney, Agent, or Firm* — Fish & Richardson P.C.

(57) ABSTRACT

Methods, systems, and apparatus, including computer programs encoded on a computer storage medium for managing beam shaping in gradient refractive index (GRIN) media are provided. In one aspect, a method includes specifying a field evolution throughout a gradient-index (GRIN) medium and generating a refractive index profile of the GRIN medium based on the specified field evolution in the GRIN medium. Diffraction effects are considered in solving for the refractive index profile. The index profile is found by specifying a desired beam transformation throughout the GRIN medium and solving a series of phase retrieval problems. The GRIN medium can be two-dimensional (2D) or three-dimensional (3D).

25 Claims, 15 Drawing Sheets

(51) Int. Cl.
    *G02B 19/00* (2006.01)
    *G02B 27/00* (2006.01)
(52) U.S. Cl.
    CPC ..... *G02B 19/0047* (2013.01); *G02B 19/0052* (2013.01); *G02B 27/0012* (2013.01); *G02B 27/0927* (2013.01)
(58) Field of Classification Search
    USPC .............................. 702/72; 385/31, 33, 131
    See application file for complete search history.

(56) References Cited

U.S. PATENT DOCUMENTS

| | | | | |
|---|---|---|---|---|
| 8,971,679 B2* | 3/2015 | Ho | ........................ | G02B 6/136 385/31 |
| 9,340,446 B1* | 5/2016 | Baleine | ................... | C03C 10/00 |
| 2012/0321249 A1* | 12/2012 | DeMeritt | ................ | G02B 6/32 385/34 |
| 2015/0016775 A1* | 1/2015 | Ho | ........................ | G02B 6/423 385/33 |
| 2015/0219989 A1* | 8/2015 | Ho | ........................ | G02B 6/132 385/33 |
| 2016/0216412 A1* | 7/2016 | Kintz | .................... | G02B 13/14 |

OTHER PUBLICATIONS

Crimmins and Fienup, "Ambiguity of phase retrieval for functions with disconnected support," JOSA, 71(8):1026-1028, Aug. 1981.
Dickey and Holswade, ""Beam shaping: a review,"" in Laser Beam Shaping Applications, F. M. Dickey, S. C. Holswade, and D. L. Shealy, eds., 269-303 (CRC, 2006).
Fienup, "Phase retrieval algorithms: a comparison.," Appl. Opt., 21(15):2758-2769, Aug. 1982.
Fienup, "Reconstruction of an object from the modulus of its Fourier transform," Opt. Lett., 3(1):27-29, Jul. 1978.
Fleck et al., "Time-dependent propagation of high energy laser beams through the atmosphere," Appl. Phys., 10(2):129-160, Jun. 1976.
Frieden, "Lossless conversion of a plane laser wave to a plane wave of uniform irradiance," Appl. Opt., 4(11):1400-1403, Nov. 1965.
Gattass and Mazur, "Femtosecond laser micromachining in transparent materials," Nat. Photonics, 2(4):219-225, Apr. 2008.
Gerchberg and Saxton, "A practical algorithm for the determination of phase from image and diffraction plane pictures," Optik (Stuttg.), 35(2):237-246, (1972).
Ghatak et al., "Design of a waveguide refractive index profile to obtain a flat modal field," Proc. SPIE, 3666:40-44, Apr. 1999.
Kogelnik, "Imaging of optical modes—resonators with internal lenses," Bell Syst. Tech. J., 44:455-494, (1965).
Kunkel and Leger, "Gradient-index design for mode conversion of diffracting beams," Opt. Express, 24(12):13480-13488, Jun. 2016.
Lee, "Method for converting a Gaussian laser beam into a uniform beam," Opt. Commun., 36(6):469-471, Dec. 1980.
Leger, "External methods of phase locking and coherent beam addition of diode lasers," in Surface Emitting Semiconductor Lasers and Arrays, G. A. Evans and J. M. Hammer, eds. Academic, pp. 379-433, 1993.
Lin and Leger, "Numerical gradient-index design for coherent mode conversion," Adv. Opt. Technol., 1:195-202, Jul. 2012.
Rhodes and Shealy, "Refractive optical systems for irradiance redistribution of collimated radiation: their design and analysis," Appl. Opt., 19(20):3545-3553, Oct. 1980.
Ries and Muschaweck, Tailored freeform optical surfaces, JOSA A., 19(3):590-5, Mar. 2002.
Romero and Dickey, "Lossless laser beam shaping," J. Opt. Soc. Am. A., 13(4):751-760, Apr. 1996.
Romero and Dickey, "Lossless laser beam shaping," JOSA A., 13(4):751-760, Apr. 1996.
Urness et al., "Arbitrary GRIN component fabrication in optically driven diffusive photopolymers," Opt. Express, 23(1):264-273, Jan. 2015.
Urness et al., "Liquid deposition photolithography for submicrometer resolution three-dimensional index structuring with large throughput," Light Sci. Appl., 2(3):e56, Mar. 2013.
Wang and Shealy, "Design of gradient-index lens systems for laser beam reshaping," Appl. Opt. 32(25):4763-4769, Sep. 1993.
Wang et al., "Alumina-doped silica gradient-index (GRIN) lenses by slurry-based three-dimensional printing (S-3DP™)," J. Non-Cryst. Solids, 349:360-367, Dec. 2004.
Yu and Capasso, "Flat optics with designer metasurfaces," Nat. Mater., 13(2), 13 9-150 Feb. 2014.
Zukauskas et al., "Tuning the refractive index in 3D direct laser writing lithography: towards GRIN microoptics," Laser Photonics Rev., 9(6):706-712, Nov. 2015.

* cited by examiner

MANAGING ELECTROMAGNETIC FIELD PROPAGATION IN GRADIENT-INDEX MEDIA

CROSS-REFERENCE TO RELATED APPLICATION

This application claims priority under 35 USC § 119(e) to U.S. Provisional Patent Application Ser. No. 62/517,779, filed on Jun. 9, 2017, the entire content of which is hereby incorporated by reference.

STATEMENT OF GOVERNMENT INTEREST

This invention was made with government support under Grant No. HR0011-10-C-0111 awarded by the Department of Defense/Defense Advanced Research Projects Agency (DARPA) and Grant No. FA9550-14-1-0382 awarded by the United States Department of Defense Air Force. The government has certain rights in the invention.

TECHNICAL FIELD

This present disclosure is related to optics and photonic devices, particularly to managing electromagnetic field propagation such as beam shaping in gradient-index media.

BACKGROUND

The general problem of beam shaping, in which the spatial irradiance profile of a given beam is transformed into a desired one, can be addressed in coherent systems by an assortment of optical devices. Simple lenses and apertures are adequate to reshape the beam in many cases, but specialized optics are necessary when intricate control over the field profile is needed.

SUMMARY

The present disclosure provides methods, systems, and computer-readable media for managing electromagnetic field propagation such as beam shaping in gradient-index (GRIN) media.

In general, one innovative aspect of the subject matter described in the present disclosure can be embodied in methods that include the actions of specifying a field evolution throughout a gradient-index (GRIN) medium and generating an index profile of the GRIN medium based on the specified field evolution that accounts for, or compensates, diffraction effects in the GRIN medium.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination.

In some implementations, generating an index profile of the GRIN medium includes: representing electromagnetic (EM) field propagation in the GRIN medium by a plurality of propagation steps of nonzero length along a reference axis, which can run parallel to the direction of beam propagation, with corresponding phase elements between adjacent steps, which change the wavefront or spatial phase profile of the beam, where each of the phase elements is between two adjacent propagation steps (or axial steps). Each phase element can be at a respective propagation position (or axial position) at ends of the steps. Representing the EM field propagation in the GRIN medium can include using a split-step beam propagation method (BPM).

In some examples, generating an index profile of the GRIN medium includes: for each of the phase elements, determining a respective phase modification profile of a field at the respective axial position of the phase element, the respective phase modification profile being a modification to a phase profile of the field through the phase element; and generating a respective index profile at the respective axial position of the phase element based on the determined respective phase modification profile.

The phase element can include a first side and a second, opposite side, and determining the respective phase modification profile of the field at the respective axial position can include: determining a first complex field at the first side of the phase element and a second complex field at the second side of the phase element; and determining the respective phase modification profile based on the first complex field and the second complex field.

The first complex field can include a first phase profile and a first magnitude, and the second complex field can include a second phase profile and a second magnitude. The first magnitude can be identical to the second magnitude, and the respective phase modification profile at the respective axial position can be determined based on a difference between the first phase profile and the second phase profile.

In some cases, determining the first complex field at the first side of the phase element includes: using the specified field evolution.

In some cases, determining the second complex field at the second side of the phase element includes: using a phase retrieval algorithm. The phase retrieval algorithm can include Gerchberg-Saxton method or input-output method. Light propagation in the phase retrieval algorithm can follow the split-step beam propagation method (BPM).

In some implementations, a phase modification at any axial position can be subdivided into a sequence of constituent phase modifications, the total phase modification at each axial position being the sum of the respective constituent phase modifications at that position. The process for determining the pertinent complex fields is then modified accordingly. For example, in the case of two constituent phase modifications per axial position, the specified field evolution can be used to find the complex field in between the constituent phase modifications at both the input and output sides of any particular axial step. There are respective first and second constituent phase modifications at the input side of the axial step and respective first and second constituent phase modifications at the output side of the axial step, while phase retrieval is used to find the complex fields for the output of the respective second constituent phase modification located at the input of the axial step, and for the input of the respective first constituent phase modification at the output of the same axial step. The phase profiles of the fields obtained this way can then be included when finding the total phase modification, e.g., by taking the difference between the fields on opposite sides of the phase modification.

The purpose of dividing each phase element at an axial position into a number of constituent phase sub-elements can be to properly account for phase error (or difference in phase) between a phase retrieval result and the specified fields, e.g. from the prescribed field evolution. Phase error can arise from incomplete convergence of the phase retrieval method, which can be due to computational cutoffs or non-existence of a precise solution. Two can be a convenient number of constituent phase modifications because phase retrieval yields solutions simultaneously at both the input and output of a propagation step (or axial step). Retaining both solutions means that the phase error information is preserved and can be incorporated into the fields that determine the refractive index profile.

It is possible to have more than two constituent phase modifications by, e.g., modifying the field(s) using a phase profile that is known by some other means. For instance, it can be desirable to apply a phase separately in order to change the starting point of the phase retrieval algorithm, which can improve computation efficiency. This can be viewed alternatively as a revision to the phase implied by the field evolution. The revision can be temporary, and cancelled by later operations (for example, if a revision to the phase is followed by an opposite one at the same axial position).

In some implementations, there are two constituent phase elements at each respective axial position between two consecutive axial steps. The method can further include: determining, based on the specified field evolution, first, second, and third complex fields at first, second, and third consecutive axial positions, a first axial step being between the first and second axial positions, a second, consecutive axial step being between the second and third axial positions; and determining, by using a phase retrieval algorithm, a first input field of the first axial step and a first output field of the first axial step based on the first and second complex fields and a second input field of the second axial step and a second output field of the second axial step based on the second and third complex fields.

The method can further include: determining a first phase modification profile of a first constituent phase element at the second axial position based on the first output field of the first axial step and the second complex field at the second axial position; determining a second phase modification profile of a second, consecutive constituent phase element at the second axial position based on the second complex field at the second axial position and the second input field of the second axial step; and determining a sum of the first phase modification profile and the second phase modification profile to be a total phase modification profile at the second axial position. For example, the first phase modification profile can be determined to be a difference of phase profiles of the first output field and the second complex field, and the second phase modification profiled can be determined to be a difference of phase profiles of the second complex field and the second input field. Generating an index profile of the GRIN medium can include: generating a respective index profile at the second axial position based on the determined total phase modification profile at the second axial position.

In some implementations, specifying a field evolution includes constructing the field evolution using a plurality of ray trajectories. Each of the ray trajectories can include a cubic polynomial trajectory. The method can further include: determining one or more parameters of each of the ray trajectories based on boundary conditions obtained from a position on a surface intersected by the ray trajectory and slope of rays at input and output surfaces. The surfaces can be planar surface or non-planar surface. It can be chosen that no ray intersections occur among the plurality of ray trajectories.

The method can further include determining a field at each axial position based on the ray trajectories by converting the field from a ray-based presentation to a complex-valued scalar representation, where the field includes a magnitude profile and a phase profile. In some examples, determining the magnitude profile includes: performing a magnitude conversion based on a local field irradiance from a ray density. In some examples, determining the phase profile includes: inferring the wavefront from ray slopes at the corresponding axial position.

Determining the phase can include: obtaining the ray slopes from the ray trajectories; constructing a wavefront from surfaces orthogonal to each of the ray trajectories; and generating the phase by integrating gradient values obtained from the constructed wavefront surface. In some implementations, specifying a field evolution includes: specifying an evolution of field magnitude using a non-ray-based algorithm; converting the field magnitude into a plurality of ray trajectories; and deriving corresponding wavefronts or phase profiles from the plurality of ray trajectories.

In some implementations, specifying a field evolution includes determining the field evolution based on predetermined input and output complex fields on respective input and output surfaces of the GRIN medium. The GRIN medium can be three-dimensional (3D).

Determining the field evolution can include: establishing, by using a mapping function, spatial correspondence between positions in the input surface and positions in the output surface; and constructing the field evolution throughout the GRIN medium using a plurality of ray trajectories that satisfy boundary conditions implied by magnitudes and wavefronts of the input and output complex fields on the input and output surfaces. In some cases, the method further includes: determining an intensity profile of a mapped surface at an axial position between the input and output surfaces by evaluating the Jacobian as a function of position in the mapped surface at the axial position. In some cases, the method further includes: determining a phase profile of a mapped surface at an axial position based on corresponding slopes of the ray trajectories at the axial position.

The GRIN medium can be configured to be a device to perform at least one of irradiance redistribution and wavefront reshaping, e.g., a beam shaper. The GRIN medium can be configured to be a beam combiner for combining multiple coherent beams. The GRIN medium can be also configured to be an imaging device, a cloaking device or a waveguide. In some examples, the GRIN medium includes glass, and a maximum index contrast of the index profile of the GRIN medium is about $1 \times 10^{-3}$. In some examples, the GRIN medium includes a polymer, and a maximum index contrast of the index profile of the GRIN medium is about 0.1.

Another aspect of the present disclosure features a method of fabricating a gradient-index (GRIN) optical element, comprising: obtaining a refractive index profile for the GRIN optical element by the method noted above and fabricating the GRIN element according to the index profile. Fabricating the designed GRIN element includes using at least one of fabrication techniques including: ion diffusion, femtosecond laser micromachining, layered photolithography, liquid deposition photolithography (LDP), lithographic direct-writing, photopolymer lithography, 3D printing, and additive fabrication.

Particular embodiments of the subject matter described in this specification can be implemented so as to realize one or more of the following advantages. For example, the technology enables the design of GRIN profiles for custom optics. In such a custom optical element, the refractive index varies continuously with position, enabling specialized optical functions such as N-to-1 beam-combining and spatial mode conversion, which go beyond the essential lens/mirror/beam-splitter optics that compose most systems. The GRIN elements can be designed to implement any possible conversion for optical beams or any spatial distribution of electromagnetic field. The beams can be coherent, incoherent, or partially-coherent.

The GRIN beam shapers provide a significant advantage over optical elements that are thin compared to the propagation length associated with the change in field. Refractive or reflective optics, such as mirrors or aspheric lenses, typically do not account for the wave-like nature of light, relying instead on a geometric approximation to light propagation where light is represented by rays. This geometric approximation is unsuitable for small, precision devices, since diffraction effects distort the spatial distribution of light, with greater effects at small size scales. Diffractive elements, such as gratings, do account for wave phenomena, but are usually inefficient. Gratings are typically fabricated with quantized phase features, producing wasted energy in unused grating orders. As more quantized phase levels are added, these grating orders diminish. However, even in the limit of a continuous grating diffractive elements are prone to "hot spots," or regions of high optical intensity that may initiate electrical breakdown or optical damage. This is because the field is not controlled over the entire propagation length, but only at particular positions along the propagation axis, namely, at the plane of the grating and the target plane. Hot spots are naturally avoided in GRIN devices designed with the method featured here because conversion of the spatial mode occurs gradually over the length in a controlled way.

By compensating beam diffraction in the index profile, the GRIN element behaves simultaneously as beam shaper and waveguide. The guiding property allows the phase and intensity changes to occur gradually, resulting in near 100% conversion efficiency at size scales that are inaccessible to other beam shaping methods. The GRIN elements can efficiently change both intensity and phase (or wavefront) across a spatial profile of a laser beam with relaxed requirements on alignment and mechanical stability. Moreover, by incorporating the effects of diffraction, reduced beam distortion can be achieved in comparison to a purely geometric design method.

Beam shaping operations in GRIN media can be performed fully in a single element rather than multiple, which offers significant improvements in ease of alignment and simplicity of the final system. The technology allows creation of specialized optics that control spatial features of a guided laser beam, which can perform advanced spatial control functions with a single monolithic element that has no internal alignment, produces little loss or scattering, and is compact and lightweight. Moreover, the GRIN elements are rugged, as optical conversion occurs inside the material. Mechanical damage can be less likely to affect the optical function at the interior, and heat removal can be performed around outside of the elements on non-optical surfaces. The optical surfaces of the GRIN elements can be planar, which results in significant mechanical mounting advantages. Separate waveguides, including disparate waveguide types (e.g. from optical fiber to an on-chip device), can be butt-coupled via the GRIN element with high efficiency.

This technology can be used to fabricate arbitrary GRIN structures or custom GRIN optical elements or devices with fabrication methods, including ion diffusion, femtosecond laser micromachining and layered photolithography, liquid deposition photolithography (LDP), lithographic direct-write techniques, photopolymer lithography methods, and 3D printing and other additive fabrication methods. The GRIN elements can be applied in embedded photonic waveguide devices for integrated photonics, beam reshapers/combiners for laser diode arrays (or fiber arrays), and beam shapers for industrial/surgical/high-energy lasers.

The details of one or more embodiments of the subject matter described in the present disclosure are set forth in the accompanying drawings and description below. Other features, aspects, and advantages of the subject matter will become apparent from the description, the drawings, and the claims.

DETAILED DESCRIPTION

Figure 1:
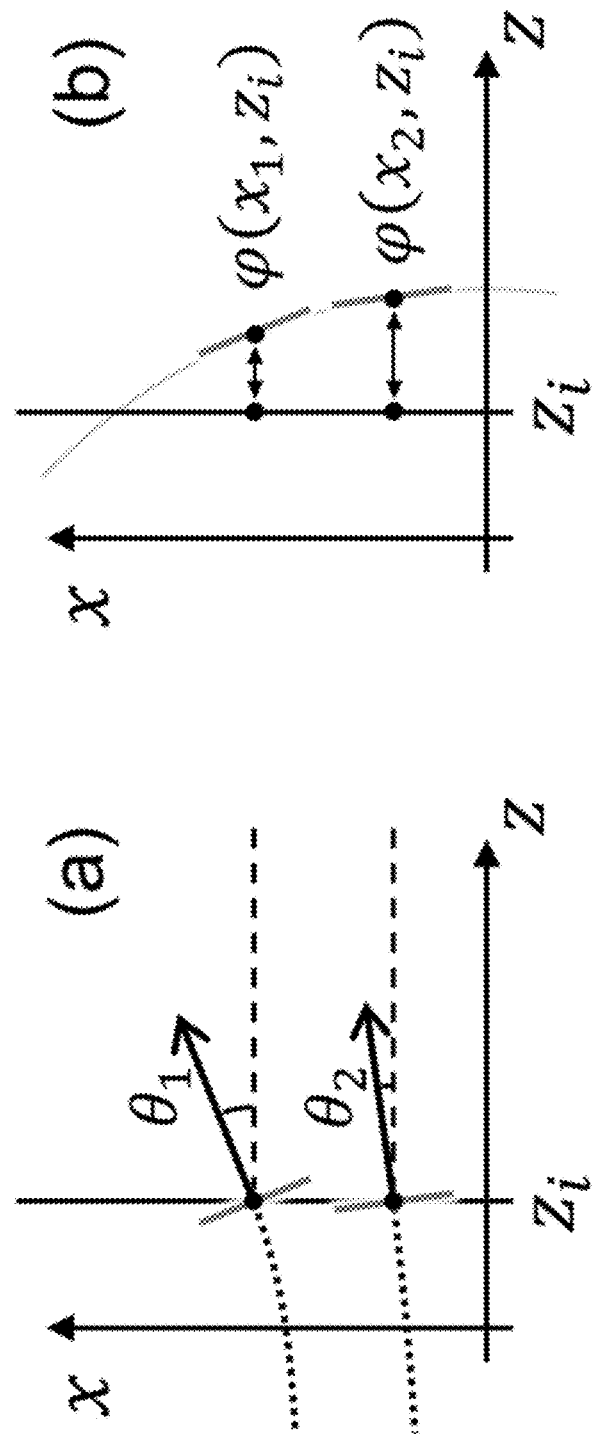
FIG. 1 shows a method for phase interpolation from ray slopes at an axial position $z_i$: (a) wavefront slopes are obtained from ray angles, and (b) the phase profile is obtained at $z_i$ from the constructed wavefront.

Optics with graded refractive index are utilized for their convenient mechanical properties, which lend themselves easily to conveniently packaged devices and which enable quick and accurate optical alignment in many applications. Gradient refractive index (GRIN) elements can avoid limitations of both step index waveguides and thin optics. Freedom over the refractive index profile in both the transverse and longitudinal direction provides the design flexibility to guide and transform a beam to and from any intensity profile and to achieve arbitrary wavefront shapes. By comparison, the limitations of thin optics are apparent in a well understood case study, where a planar diffractive optical element (DOE) is followed by a given length of propagation z in free space. Although such a system can accurately transform the field within certain limits, it cannot achieve an arbitrary intensity profile in general. A phase-only function is insufficient to adequately reshape the spatial frequency profile when z is large, because the effects of diffraction become too prominent. This limitation vanishes in GRIN media, which can modify the field gradually with propagation and can compensate the effects of diffraction while transforming the beam.

In the geometric approach to beam shaping with phase-only elements, a given input field is converted into a desired one using two optical elements spaced by a finite axial distance. The initial field is modeled as a collection of rays, and the first phase element tilts each ray appropriately so that propagation to the second element results in the desired intensity profile. The ray directions at the second plane are then corrected by the second optical phase element, which produces the desired phase profile on the beam. This arrangement can be implemented with several types of optical elements, including aspheric lenses, selectively aberrated spherical lens systems, and gradient-index (GRIN) lenses. Although this arrangement is appealing due to its simplicity, it cannot achieve perfect beam shaping in general due to diffraction. Diffractive effects in this system are conveniently described by the parameter $$\beta = C \frac{r_i r_o}{(\lambda/n_0) L}, \tag{1}$$

where $r_i$ and $r_o$ are the half-widths of the beam at the input and output plane, $\lambda$ is the wavelength in vacuum, $n_0$ is the background refractive index, L is the propagation length, and C is a constant that depends on the particular beam geometries. If the phase elements are designed using a geometric model, the system can provide a reasonably good beam transformation only if β is large. For the conversion of a Gaussian beam to a flat top, the required value of β is typically β>32, where $C=2(2\pi)^{1/2}$.

Beam shapers that account for diffraction incorporate the wave nature of light. In the case of DOEs, the light is modified at two distinct planes by two phase elements. The first imparts a phase profile that produces the desired irradiance upon propagation to the second plane. The second element is used to correct the leftover phase distortion. However, performance degrades as β becomes small. This leaves a need for a beam shaping method that remains accurate and efficient at all size scales. Additionally, typical DOEs are fabricated with discontinuous jumps in phase, which produces wavefront distortions and/or unwanted grating orders, further lowering their efficiency.

GRIN media circumvent these limitations by converting the irradiance distribution of a laser beam in a continuous manner. Instead of imparting the necessary phase in a single plane, the inhomogeneous medium reshapes the beam gradually during propagation. Further, since the refractive index contains only continuous gradients, no discontinuities are introduced to the wavefront. This technique can produce beam shaping with near-perfect efficiency. However, utilizing a GRIN design methodology with a purely ray-based approach, as seen in earlier methods, may limit the technique to large beam sizes that propagate over short distances.

Implementations of the present disclosure provide a method of managing beam shaping in GRIN media to include the effects of diffraction that are encountered with smaller input beams, tighter spot focus, and longer propagation lengths. Initially, a ray mapping is used to specify a field evolution that describes a gradual transformation of the field throughout the GRIN medium, and then phase retrieval methods are used to calculate a modified inhomogeneous index profile that compensates for diffractive effects. The advantages of high conversion efficiency and simplified phase correction can be maintained, making the optical elements ideal for applications, e.g., in the areas of laser arrays and integrated waveguides.

Designing GRIN Beam Shapers

Designing a GRIN beam shaper is an inverse problem, since the desired input and output fields of the GRIN element can be first known, but the transformation itself is not known. In GRIN media, there are many ways that such a transformation can be achieved, in contrast to thin-element systems where the input and output fields are related by a simple operator for propagation in free space. There is no clear operator in GRIN design since the beam is shaped continuously by the refractive index gradients in the transverse and the axial directions. However, the task of GRIN design can be made tractable by treating the situation as an index recovery problem. That is, given an observation of how the field should evolve throughout a GRIN element, it is relatively easy to find an index profile consistent with the observation. Actual observations of the field evolution need not be made; in the design problem the specified observation can be made arbitrarily.

To proceed in this manner, the GRIN design can include two steps: (I) specifying a field evolution that describes a gradual transformation of the field throughout the GRIN element, and (II) solving for the refractive index based on this specified field evolution.

I. Specifying the Field Evolution

Specifying the field evolution inside the GRIN element or medium can include writing the field evolution in terms of a family of ray trajectories. The transverse position x of each ray as a function of axial position z can be written as a function Y, that is, x=Y(z, h), where h is a number that identifies a particular ray. It is assumed that none of the rays turn backwards. If Y is sampled by a finite number of rays, then h takes on discrete values. In accordance with conservation of energy and continuity of optical path length (OPL), the irradiance at a given surface in the GRIN medium is proportional to the ray density, and the rays are everywhere normal to the wavefront. Thus, the magnitude profile is determined by the ray positions, while the phase is determined by the ray slopes. This specifies the complex values of the field everywhere throughout the medium.

A family of ray trajectories can be found by "connecting the dots" between the entry and exit points of the rays in the GRIN element. The entry and exit points are found from a sampled ray representation of the field at the input and output planes. A way to specify the trajectories joining these points is to have them all follow the same functional form, where the ray positions and slopes at the input and output are used as boundary conditions. A cubic polynomial of the form $x(z)=az^3+bz^2+cz+d$ can be used, although other functions, such as partial sinusoids, may be used. The ray trajectories can be chosen so that they do not intersect, as caustics signify a pole in the irradiance and an ambiguity in the phase. In the special case where the rays enter and exit the GRIN element parallel to the propagation axis (that is, both wavefronts are flat), it can be shown that the cubic polynomial form produces no ray intersections.

In some embodiments, the field is expressed by a set of rays with cubic polynomial trajectories through the GRIN volume. Boundary conditions to determine the polynomial coefficients are given by the position and slope of rays at the input and output planes. These are found by converting the desired fields from a complex scalar representation to a ray representation. By assuming that none of the rays intersect, there can be one possible mapping between the input and output rays that follows this form. Finally, with ray trajectories filling the GRIN volume, the field can be found at each axial position.

Using a ray model to initially specify the field evolution does not diminish the accuracy nor usefulness of the GRIN design method for beams where diffraction is important. Although wave effects normally cause a propagating field to deviate from a ray description, here the error is compensated by modifying the index profile, which avoids disagreement between the wave-like actual field and the ray-based specification. The phase retrieval method ensures that the realized evolution in the GRIN element will match specification, and thus the ray-based field evolution should result in phase elements that cancel the wave effects normally responsible for the disagreement.

It is useful to consider a few numerical details if the ray mapping is used for the field evolution. In particular, one can convert the field at each axial step from a ray-based representation to a complex-valued scalar representation. In a complex representation, both the magnitude and phase are needed for a complete description of the optical field.

The magnitude conversion is performed by finding the local field irradiance from the ray density. The phase conversion can be performed as shown in FIG. 1, where the phase profile is inferred from the ray slopes. At a plane of interest ($z=z_i$) where the phase profile is desired, the ray slopes $\theta_1, \theta_2, \ldots$ are known from the cubic ray paths. These are incident from the left in (a) of FIG. 1. The wavefront is constructed from the planes orthogonal to each ray, and phase values are then obtained from the z height of the constructed wavefront as shown in (b) of FIG. 1. Since the ray slope is given by $dz/dx=\tan\theta$, and for a paraxial wave $d\varphi=k_0\,dz$, the interpolated phase can be written as $$d\varphi(x,z_i)=k_0\tan\theta(x,z_i)dx \tag{2}$$

The desired phase profile in a given plane can then be found by integrating with respect to x. Once the magnitude and phase profiles have been found from the ray mapping, the field is defined at every step position. This completes the specification of the field evolution.

In some cases, it is limiting to construct a field evolution from a set of predefined ray trajectories. In particular, fields containing one or more zeros are difficult to transform into fields with a different number of zeros. This difficulty can be avoided by using a non-ray-based method to specify the evolution of the field magnitude. In some cases, this prescription for the magnitude can then be converted into a set of ray trajectories from which the accompanying wavefronts can be derived. In some cases, the specified field evolution is used to solve or obtain the index profile with rays being used in an intermediate step in the process, and in some other cases, without using rays at all.

Regardless of how the prescription for the field evolution was obtained, the index function can be calculated according to a mathematical model for how the field propagates in the medium. In the following, it is assumed that a field evolution has already been obtained. At that point, all that remains is to compute the index profile that is consistent with the specified field evolution.

II-1. Ray-Based GRIN Calculation

A ray-based model for the field propagation is suitable if diffraction effects are expected to be negligible. The Fresnel number offers an estimation of the prevalence of diffraction in homogeneous media. It is given by $N=w^2/(\lambda d)$, where w is an aperture width or beam size, $\lambda$ is the wavelength, and d is the propagation distance. It can be applied in GRIN media if the spatial frequencies added by the index profile do not have a dominant influence on w. For roughly $N>1$, a ray representation is valid, although the degree of accuracy depends on the particulars of the problem, including the beam shapes, sizes, and the refractive index profile ultimately chosen.

The eikonal equation, which governs ray propagation in an inhomogeneous medium, establishes the link between prescribed ray trajectories and the refractive index profile in the geometric propagation regime. The equation reads:

$$|\nabla S(r)|^2 = n^2(r) \qquad (3),$$

where S is a scalar function representing the OPL at all positions r, and n is the refractive index in the GRIN medium. Contours of S are surfaces of constant OPL, which is the physical meaning of the wavefront. Therefore, if a series of wavefronts with known OPL spacing is obtained, then it is possible to calculate n(r) via $\nabla S(r)$. That is, if discrete wavefronts happen to be known at increments of $\Delta S$, the gradient between two consecutive wavefronts can be can be calculated as $|\nabla S(r')| = \Delta S / \int ds$, where $\int ds$ is the arc length of the ray segment bounded by the two given wavefronts, and r' is a position along the ray in question.

Figure 2:
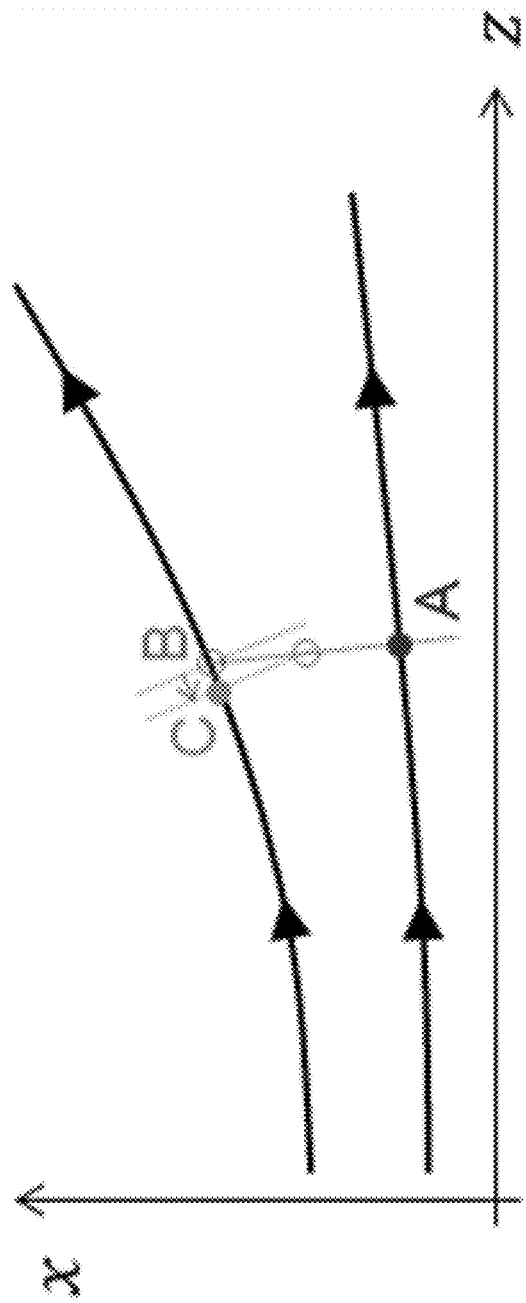
FIG. 2 shows a method of constructing a wavefront between a pair of rays, where starting from the point A along the first ray, the position C of the wavefront along a second ray is found by linear interpolation.

Such a series of wavefronts can be constructed from a set of ray trajectories using the interpolation method shown in FIG. 2. From a starting point A occurring on one ray, the normal line at A is extended to the next ray. This yields the intersection point B. However, the slope of the ray normal at B may be not the same as that at A. Since contours of S occur along ray normals, B is therefore not on the same contour of S as A is. By making a small correction, however, the point along the second ray that lies on the contour of S can be found. The slope of the ray normal at B is computed, and this is treated as an approximation to the slope of the contour of S on the second ray. By linear interpolation, the midpoint of AB is assumed to lie approximately on the contour of S. From this, a new line extending from the AB midpoint with the slope of the normal at B yields a new intersection point, C, that is a corrected version of the S contour on the second ray. The point C joins the contour of S currently being constructed, and the process is repeated for each sequential pair of rays until all rays have been used. A new wavefront is constructed at the next axial position by incrementing the value of S along a reference ray and repeating the process. By assigning a value of S to each wavefront along the reference ray, the refractive index solution becomes unique. When wavefronts have been constructed throughout the medium, S(r) and therefore $\nabla S(r)$ can be found by interpolation. The wavefront interpolation method described in FIG. 2 can also be applied to the design of GRIN elements that incorporate diffraction. In other words, this method (or any other method) can be substituted for the interpolation method described by FIG. 1. However, usage of the eikonal equation to calculate the refractive index is unique to a GRIN design method that does not account for diffraction.

II-2. Paraxial Wave-Based GRIN Calculation

Methods of fabrication impose a limited range on the possible refractive index values $\Delta n$ that can be achieved. This in turn puts a limitation on the GRIN profiles that can be realized. However, a smaller $\Delta n$ range is needed for longer device lengths, so a reasonable workaround to a limited $\Delta n_{max}$ is to design a longer element. However, increasing the length decreases the Fresnel number, which may cause the purely ray based propagation method to become inappropriate. Therefore, to achieve good beam shaping with a longer device length, a diffractive model can be used to design the GRIN element.

In the wave based GRIN design method, which accounts for diffraction, propagation of the field through the inhomogeneous medium can be modeled by a split step paraxial beam propagation method (BPM). In this model, the GRIN medium is represented by a series of thin phase elements representing the local refractive index or divided into a series of homogeneous propagation steps of length $\Delta z$ with an infinitesimally thin phase element between each step. For simplicity, 2D notation is used in the following, but extensions to 3D also follow, as described with further details below.

Defining x as the transverse position and $z_i$ as the axial position of the $i^{th}$ phase element, the phase $\varphi_i(x, z_i)$ acquired on the $i^{th}$ propagation step due to the index profile $n_i(x, z_i)$ is applied by multiplying the field by the term $\exp[j\varphi_i(x, z_i)]$. According to scalar paraxial BPM theory, the phase can be given by $$\varphi_i(x,z_i) = k_0 \Delta z \Delta n_i(x,z_i) / n_0 \qquad (4),$$

where $\Delta n_i(x, z_i)$ is $$\Delta n_i(x,z_i) = n_i(x,z_i) - n_0 \qquad (5).$$

In these equations, $k_0 = 2\pi n_0 / \lambda$, and $n_0$ can be taken as the on-axis refractive index value.

By virtue of Eqs. (4) and (5), the index profiles $n_i(x, z_i)$ at each axial position are known if the phase profiles $\varphi_i(x, z_i)$ are known, and thus an index profile can be created for the desired GRIN element. The phases $\varphi_i(x, z_i)$ are not known initially, but they can be found via phase retrieval if field magnitude information is provided at the input and output of each propagation step. Magnitude profiles can be found by providing in advance a desired field evolution throughout the GRIN region, as discussed above. This field evolution can then define the refractive index profile.

Figure 3:
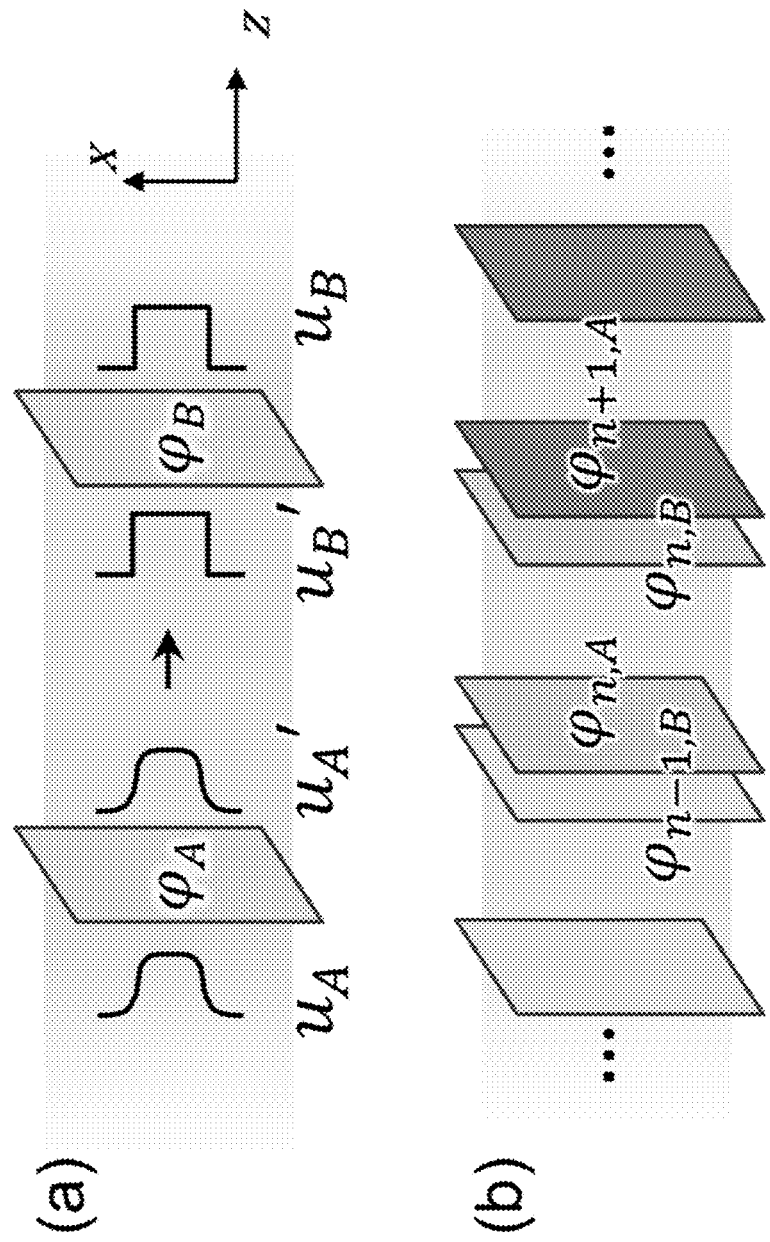
FIG. 3 shows a split-step scheme for determining phase modulations from refractive index: (a) an individual split-step sequence and (b) a sequence of consecutive steps.

To pose each propagation step as a phase retrieval problem, each step can be divided into a three-part sequence composed of a propagation length in homogeneous material (with constant refractive index) sandwiched by two phase elements $\varphi_A(x)$ and $\varphi_B(x)$, which are to be determined. A single sequence is illustrated in (a) of FIG. 3. Assume for the moment that the complex fields just outside both phase elements, $u_A(x)$ and $u_B(x)$, are known in both magnitude and phase. Then the magnitudes of the fields inside the phase elements, $u_A'(x)$ and $u_B'(x)$, are known, but the phases are not. Dropping the understood x-dependence from the notation, this can be written: $|u_A| = |u_A'|$ and $|u_B| = |u_B'|$. However, since the phase elements $\varphi_A$ and $\varphi_B$ are unknown, the phase of the fields, $\arg(u_A')$ and $\arg(u_B')$, are also unknown. Given the known magnitudes, the unknown phases can be found using phase retrieval methods, such as the Gerchberg-Saxton algorithm or input-output methods.

Once the phase profiles of $u_A'$ and $u_B'$ are have been found using phase retrieval, the phase elements $\varphi_A$ and $\varphi_B$ are given simply by the phase difference of the fields on either side of the elements. If the assumption is that $u_A$ and $u_B$ are fully known, the transmission expressions $u_A' = u_A \exp(j\varphi_A)$ and $u_B = u_B' \exp(j\varphi_B)$ can be solved for $\varphi_A$ and $\varphi_B$. The phase functions of the neighboring propagation sequence are found in the same way, with new input and output fields. After every sequence is solved, abutting pairs of phase elements can be summed directly since their axial separation is zero. Referring to (b) of FIG. 3, composite phase elements are formed by $\varphi_{n-1,B} + \varphi_{n,A}$ at a first axial position and $\varphi_{n,B} + \varphi_{n+1,A}$ at a second, sequential axial position. The index profiles $n_i(x, z_i)$ at each step are then obtained from the summed phase profiles using Eqs. (4) and (5).

In other words, for the implementation described above, there are two constituent phase modifications at each axial position that contribute to the total phase modification. The sum of these constituent phase modifications equals the total phase modification, which defines the refractive index according to $$\Delta n_i(x) = \frac{\varphi_i(x)}{k\Delta z}, \quad (6)$$

where $k=2\pi/\lambda$ and $\lambda$ is the wavelength in free space, the refractive index difference $\Delta n(x)$ is taken with respect to $n_0$, and the subscript i denotes the $i^{th}$ discrete axial position.

Figure 4:
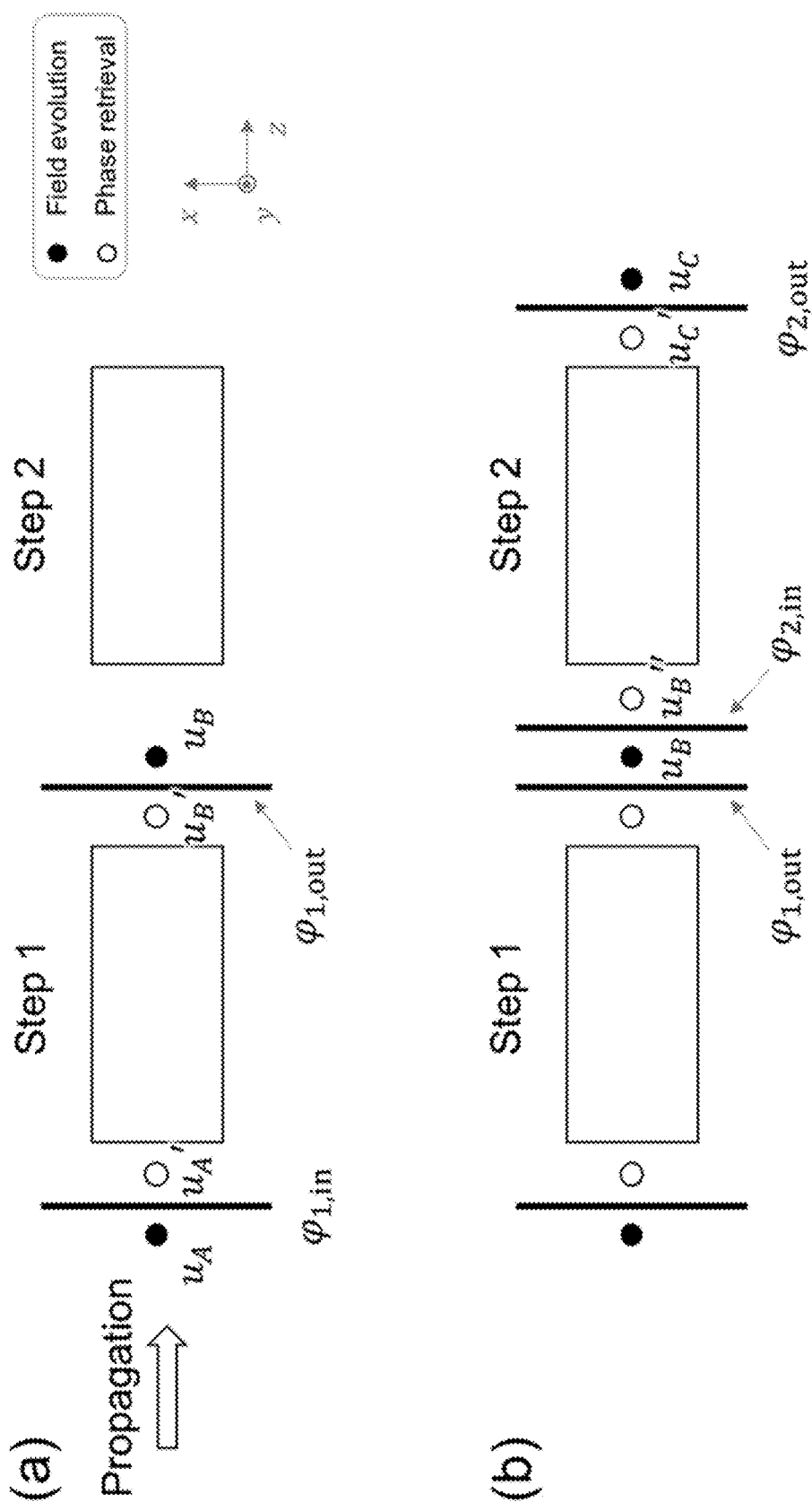
FIG. 4 shows how two constituent phase modifications are obtained between two propagation steps. Fields on either side of a homogeneous propagation length (represented by white-filled circles) are obtained by phase retrieval, based on fields at corresponding axial positions in the prescribed field evolution (represented by black-filled circles). The process is shown for two adjacent axial steps: (a) Step 1, and (b) Step 2.

The process is summarized in FIG. 4. For a first step sequence, Step 1, the fields on both sides of the homogeneous propagation length (propagation step or axial step) are taken from the prescribed field evolution at the corresponding axial positions. As shown in (a) of FIG. 4, one of these fields, $u_A$, is located at the input side of a constituent phase element on the input side of the propagation length. The second field, $u_B$, is located at the output of a constituent phase element on the output side of the propagation length. The fields $u_A'$ and $u_B'$ on the opposing sides of the phase elements are found by phase retrieval, according to the methods described above. Then, the difference between the fields ($u_A$ and $u_A'$, $u_B$ and $u_B'$) on both sides of the phase elements yields the phase profiles $\varphi_{in}$ and $\varphi_{out}$. However, to write the total phase modification at the axial position between Step 1 and Step 2, another constituent phase element may be found.

To find the second constituent phase element between the steps, the above process is repeated for Step 2. This is illustrated in (b) of FIG. 4. Fields $u_B$ and $u_C$ are obtained from the field evolution, and $u_B''$ and $u_C'$ are then found by phase retrieval. The difference between fields produces $\varphi_{2,in}$ and $\varphi_{2,out}$. Since $\varphi_{2,in}$ (from Step 2) and $\varphi_{1,out}$ (from Step 1) occur at the same axial position, they can be summed to yield the total phase modification at their axial position. That is, at the axial position between Step 1 and Step 2, the phase modification for defining the refractive index in Eq. (6) is $\varphi_i = \varphi_{1,out} + \varphi_{2,in}$. Therefore, at axial positions between two propagation steps, the total phase modification contains contributions from both the preceding step and the following step. At the first and last steps of the GRIN element, there can be one phase contribution instead of two. Note that all terms in the above discussion can be spatially varying in the transverse directions x or y.

It can be useful to initialize phase retrieval with a phase profile that approximates a final solution. Providing an accurate "guess" to the phase retrieval algorithm can improve the accuracy of the final result and improve computation time. To generate such a guess, the phase of the fields from the field evolution may be used directly, or the phase may be modified arbitrarily. Changes to the phase of the fields obtained from the evolution, and used in the method described above, can be made without adversely affecting the refractive index solution if they are accounted for when calculating $\varphi_i$.

Example Applications of the GRIN Design Method

To demonstrate the method and to assess its accuracy, three examples of GRIN beam shapers are provided. The first is a Gaussian to flat-top mode converter. The index profile is solved using phase retrieval as described above, and the solution is compared to one obtained from a purely geometric design method. The second and third examples show a GRIN element that performs coherent addition of multiple beams using the method that accounts for diffraction. The GRIN medium performs complete aperture-filling by preventing interference between neighboring beams. Particularly, the second example (Example 2) uses a design method that begins with specified ray trajectories, while the third example (Example 3) begins with a field description that does not utilize rays.

Example 1. Gaussian to Flat-Top Beam Shaper

In the first example, an index profile is designed to convert a Gaussian beam to a flat-top. The complex fields at the input and the output have the general form $$u(x) = \exp[-(x/a)^m] \quad (7),$$

where a is the half-width of the beam and m is the supergaussian order. A Gaussian at the input is obtained by setting m=2, and a supergaussian with m=10 is used at the output. The phase profiles of both fields are flat. In this example, a is 50 μm for both fields, the GRIN device length is 5 mm, the optical wavelength $\lambda$ is 1 μm, and background index $n_0$ is 1.5. The step size $\Delta z$ is 5 μm.

Figure 5:
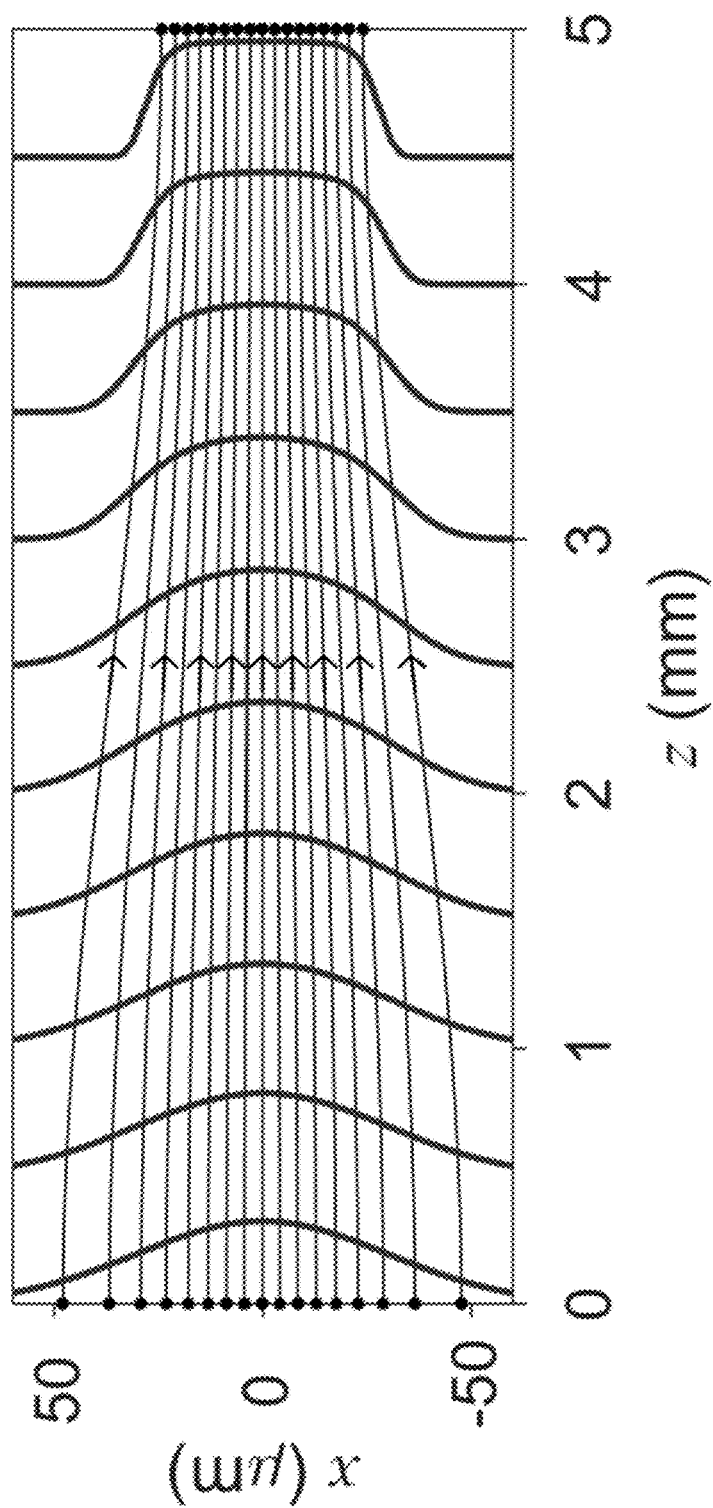
FIG. 5 shows specified ray trajectories for a Gaussian to flat-top conversion, where the intensity profiles are implied by the density of rays at each z.

With these specifications, a cubic ray mapping is created and then the phase retrieval algorithm is run to find the index profile that performs the desired conversion. An example field evolution is shown in FIG. 5, where different beam sizes at input and output are used to emphasize the ray bending. The local irradiance is given by the ray spacing; the input Gaussian at z=0 is represented by rays that are placed farther apart upon increasing distance from the axis, and the ray spacing is largely uniform for the output beam at z=5 mm. These ray trajectories imply the irradiance evolution shown in the curves of the figure, where it is clear that the beam changes continuously from Gaussian to flat-top over the full length of the converter. The phase profiles at each plane (not shown) are recovered from the ray slopes. The mapped field is then used as an input to the phase retrieval algorithm.

Figure 6:
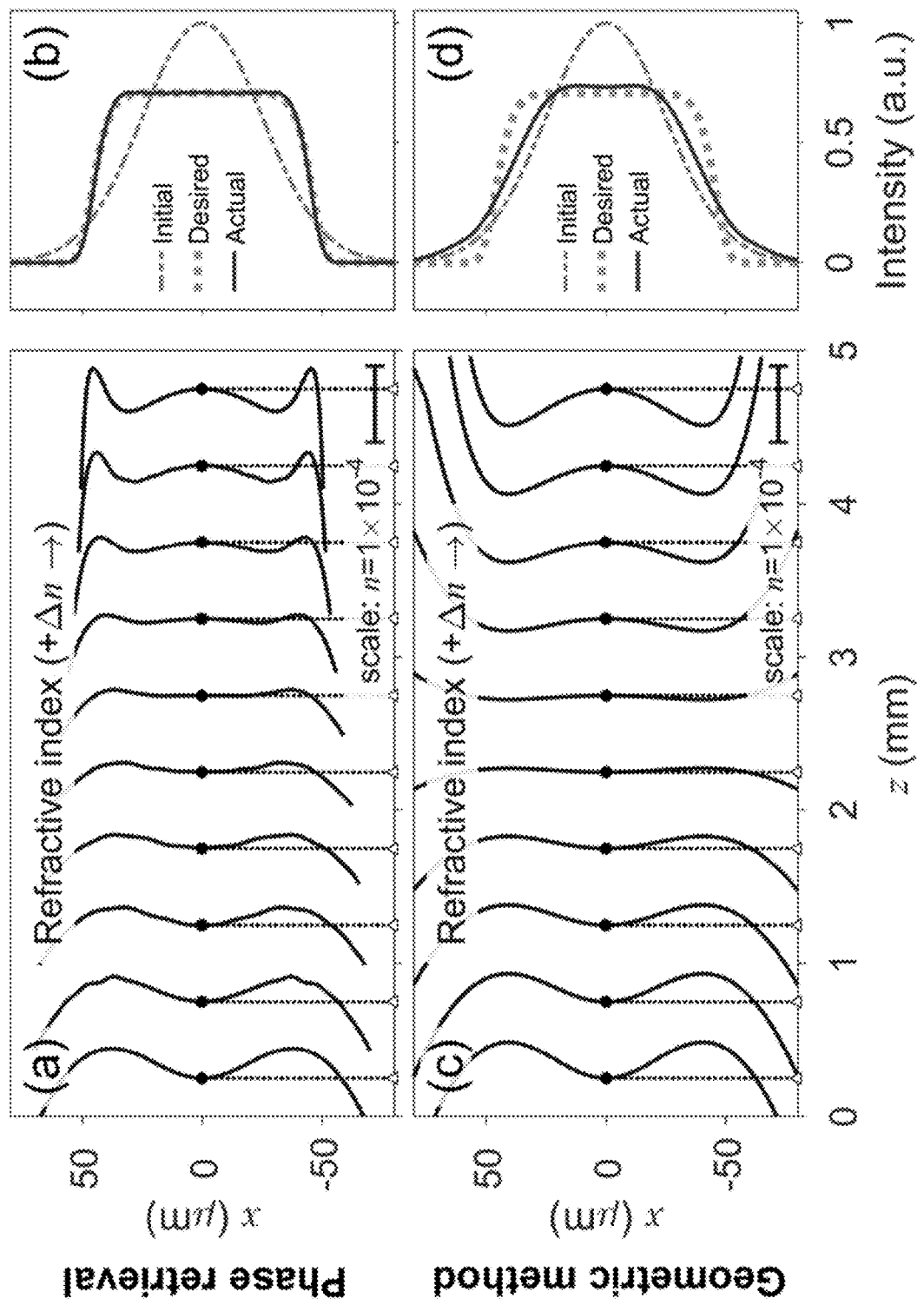
FIG. 6 shows a comparison of two designs for a GRIN element meant to convert a Gaussian beam into a super-gaussian: (a), (b) phase retrieval method; (c), (d) geometric design method. Plots (a) and (c) show the refractive index minus background ($\Delta n$) evaluated at each of the marked z values (white triangles). Both z and $\Delta n(x)$ run along the horizontal direction. Positive $\Delta n$ is to the right, and $\Delta n=0$ at each pertinent reference dot. (b), (d) Intensity profile of the field after wave-based propagation through the associated GRIN element.

By constructing the desired field evolution and then running the phase retrieval method, the index profile is obtained. Diagram (a) of FIG. 6 shows how the index profile performs the desired conversion. It can be understood, in part, by considering the concavity of n(x) at particular values of z. Near the input plane (z=0), the index profile acts as a negative lens near the axis and as a positive lens farther out. The combined effect is to pull beam energy outward from the center of the Gaussian and inward from the tails. This continues as the beam propagates along z until about the middle of the converter, at which point the transverse index gradient changes direction and the maxima on either side of the axis are replaced by minima. This slows the beam expansion and compensates the transverse phase profile that has built up during propagation in the first half of the GRIN element. By the very end of the GRIN element, the beam is a collimated supergaussian. Looking at the edges of the transverse profile (extreme |x|), it is seen that the index has developed positive lobes at the edges of the beam. This resembles the step-index structure that is used in waveguides for flat-top modes. The solution can be verified by propagating the input field through the GRIN element using the split-step method. The propagated field is compared to the output specification in diagram (b) of FIG. 6, and good agreement is clear.

The advantage of the phase-retrieval design method can be shown by comparing this beam shaper to one that is designed using a purely geometric method (ray-based, using the eikonal equation). With the same field evolution, the resulting index profile using the geometric method will neglect diffraction since a geometric-optics propagation model is assumed. The index profile is shown in diagram (c) of FIG. 6. Its general shape is similar to the diffraction-compensated index profile of diagram (a) of FIG. 6, but differences are apparent particularly at large z. Most notably, at extreme |x| the direction of the index gradient is positive with increasing distance from the axis. This anti-waveguiding behavior clearly does not compensate diffraction and will cause the beam to distort with propagation.

The shortcomings of the geometric index profile become further evident when the input Gaussian beam is propagated through it. The output intensity for the geometric GRIN element is compared to specification in diagram (d) of FIG. 6. The lack of guiding index structure causes the beam to spread while it passes through the GRIN element, resulting in an incomplete mode conversion. Both the geometric and the phase retrieval methods produce an index profile that causes the field to follow the specified evolution according to the respective propagation model. However, the geometric model does not accurately describe the wave-like character of the beam, so the actual field does not obey the specified evolution if it is strongly diffracting. This example has a Fresnel number of 0.75, so diffraction effects are expected to be noticeable. Given this, it is not surprising that the index profile of the phase retrieval method differs from that of the geometric method.

Example 2. Beam Addition for Three Mutually Coherent Gaussian Beams

As a second example, a GRIN element is designed for the coherent combination of multiple beams. GRIN media are advantageous for beam combining, since combining elements in free space utilize lossy, alignment-sensitive elements like gratings, spatial filters, and beam splitters whereas GRIN media are low-loss and low-complexity. In integrated optics, the step-index Y-branch waveguide is widely used and highly efficient, but its small size puts it at risk of optical damage or nonlinear effects at high power, whereas a GRIN element can be operated at larger size scales.

Figure 7:
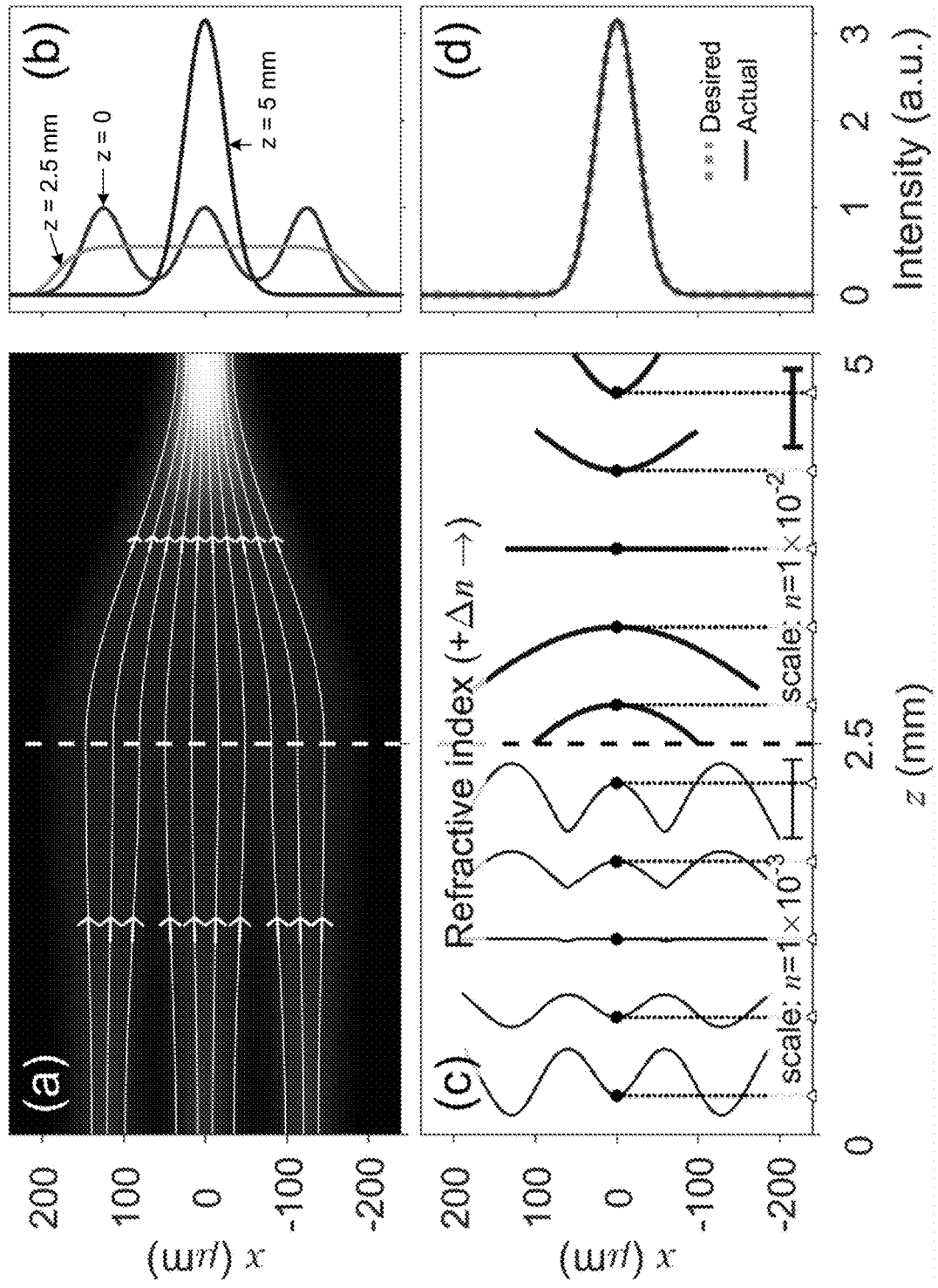
FIG. 7 shows a GRIN element that performs coherent addition of three Gaussian beams. (a) Rays and field magnitude expressing the desired intensity evolution. The vertical dashed line marks the boundary between the two parts of the GRIN element: an aperture-filling part (left) followed by a reshaping part (right). (b) Desired intensity profiles at selected axial positions. (c) Index profile of the desired GRIN element found using phase retrieval. Refractive index minus background ($\Delta n$) is plotted at each of the marked z values (white triangles). (d) Irradiance profile of the beam after wave-based propagation through the GRIN element.

In this demonstration, a linear array of three identical Gaussian beams is converted into a single Gaussian. This is accomplished using two sequential GRIN stages. The first stage performs an aperture-filling operation, and the second stage reshapes and resizes the beam. The design of such a GRIN element is shown in FIG. 7. Each of the input beams has a spot radius of 50 µm and the beam centers are separated by 125 µm. At this scale, the beams are both strongly diffracting and strongly interacting. The beams are assumed to be mutually coherent and in-phase. As with the mode converter, the desired field evolution is described by a collection of rays with cubic polynomial trajectories. Two separate sets of polynomials are used for the two stages of the GRIN element. The rays are shown with the desired intensity evolution in diagram (a) of FIG. 7. Cross-sections of the desired intensity at the input, middle, and output planes are shown in diagram (b) of FIG. 7. A supergaussian with m=10 is used at the midplane to specify the aperture filling.

The index profile is again found using the phase retrieval approach, and the three Gaussians are propagated through the GRIN element afterwards to check the performance. The index solution is shown in diagram (c) of FIG. 7. The two stages of the index profile each have a distinct character: the first stage pulls the three Gaussians together and then corrects the accrued phase, while the second focuses the beam and follows with recollimation. The intensity after propagation is shown in diagram (d) of FIG. 7, which again shows good agreement. The $M^2$ value and Strehl ratio are both found to be within two decimal places of unity.

Although beam resizing is commonly needed in application, the aperture-filling operation can be more important in coherent beam addition. When performing aperture-filling with thin diffractive optics, there is usually a tradeoff between fill factor and beam interaction. As the beams are made to overlap more to increase fill factor, their mismatched wavefronts cause undesired interference. This is one area in which a GRIN element provides a distinct advantage: guiding effects provided by the continuous medium ensure that there is no difference in the slope of the wavefronts of neighboring beams, and further, the beams do not distort due to diffraction. As a result, there are no interference fringes between them.

Example 3. Beam Addition for Four Mutually Coherent Gaussian Beams

Figure 8:
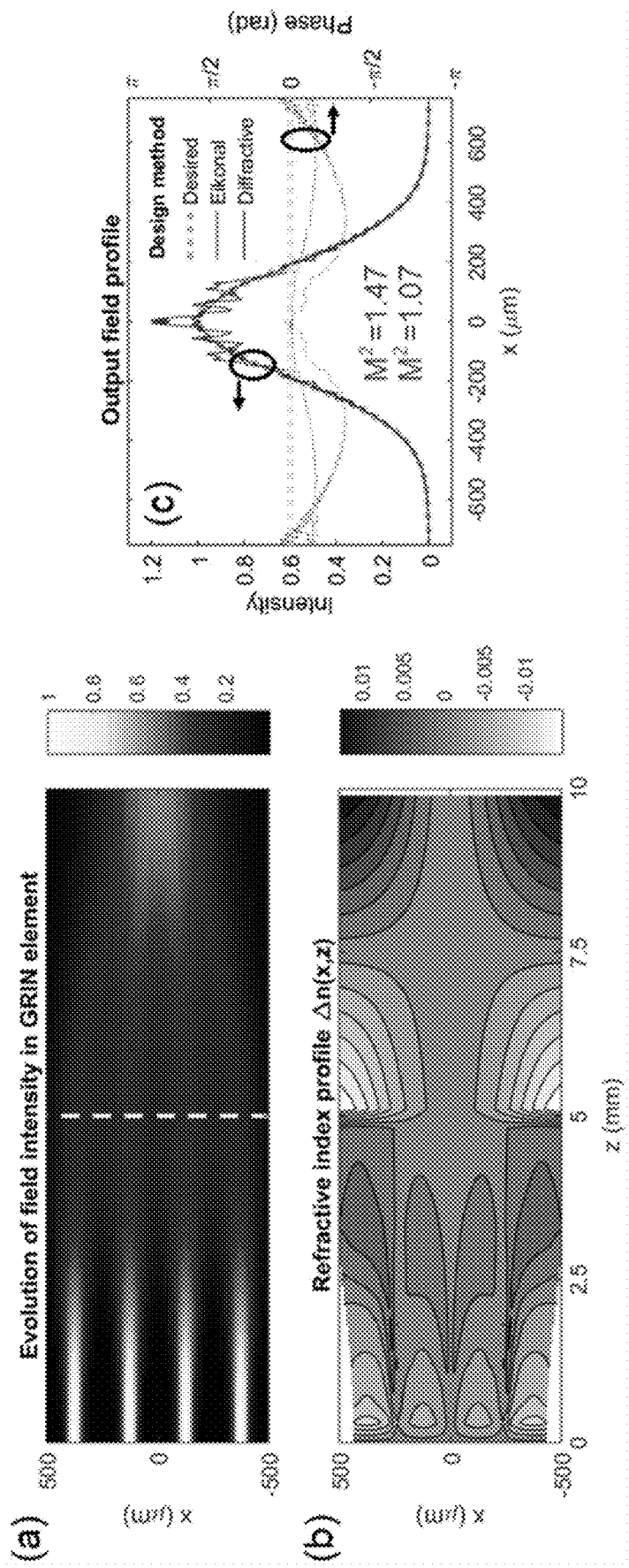
FIG. 8 shows a design of a GRIN element that performs 4:1 beam combining with Gaussian beams, where the output is also Gaussian. (a) The square magnitude of the field throughout the GRIN element. (b) Refractive index distribution found from phase retrieval; background index $n_0=1.5$. (c) Intensity and phase profiles after propagating the intended input field through the GRIN solutions from each design method.

As shown in diagram (a) of FIG. 8, four evenly spaced Gaussian beams, each with a $1/e^2$ intensity radius of 50 µm, enter a GRIN element from the left. The beams have individually flat wavefronts and are mutually coherent at a wavelength of 1 µm. They emerge from the GRIN element as a single Gaussian with a larger $1/e^2$ intensity radius of 375 µm. To produce the design, the GRIN element is divided into two sections. In the first section (z=0-5 mm), the beams expand in such a way that their magnitudes overlap but no interference fringes form. This is possible if the GRIN element adopts an index profile that causes purely constructive interference across the regions of overlap. In the second section (z=5-10 mm), the overlapped beams are reshaped into the final Gaussian. Per the methods discussed above, the field evolution in the first section is initially written from an arbitrary rayless description, and the evolution in the second section follows a set of cubic polynomial ray trajectories. The rayless description is obtained from the known propagation characteristics of Gaussian beams. The four Gaussian beams are assumed to be initially in phase, and they propagate forward as they would in a homogeneous medium, undergoing a change in size due to diffraction. The arbitrary specification also assumes that the intensity of the beams add linearly (or the field magnitudes in quadrature). This yields a particular magnitude profile at all x and z throughout the GRIN element, and it implies a variation in the wavefront, as the tilt of the wavefront between neighboring beams can be brought into agreement to avoid the formation of interference fringes.

The refractive index function that is found by phase retrieval is shown in diagram (b) of FIG. 8. At the beginning of the first GRIN section, each beam experiences a roughly quadratic index profile that causes the beam to expand while remaining Gaussian. Near z=5 mm, where the beams significantly overlap, the index profile becomes smoother in the x direction to match the wavefronts of neighboring beams. At z>5 mm, the overlapped Gaussians are together focused and only slightly reshaped. The index profile is dominated by the redistribution of optical power from the edges of the beam to the center of the final Gaussian.

As mentioned above, the wave-based design method has advantages over the eikonal method at low Fresnel number. For the beam shaping problem addressed in FIG. 8, the Fresnel number is $(50 \ \mu m)^2/[(1 \ \mu m)(10 \ mm)]=0.25$, so diffraction effects are noticeable but not critically important. The two methods are compared by using each one to find an index profile from the same prescription for the field evolution, and then propagating the intended input field through the index solution using the split-step BPM. The beam emerging from the output in each case is shown in diagram (c) of FIG. 8. Although both the eikonal and wave-based results agree reasonably well with the desired output Gaussian, some ringing appears in the beam from the eikonal solution due to uncompensated diffraction and subsequent interference between the input beams.

The GRIN element of FIG. 8 yields an increase in the overall field radiance with very high efficiency. The output field is a single coherent beam, not simply a side-by-side superposition of the expanded beams. This is expressed succinctly by the $M^2$ values, which are 1.47 for the eikonal solution and 1.07 for the wave-based solution. That is, the output field remains Gaussian after emerging from the GRIN element. These examples have shown that the phase retrieval method performs well in some cases that are challenging with a geometric approach.

Waveguide Applications of the GRIN Design Method

In some implementations, the design methods for GRIN beam shapers can be applied to waveguide devices. Waveguides can be distinguished from beam shapers because their function is to maintain the irradiance profile of a beam during propagation, whereas the function of beam shapers is to change it (and/or the phase profile). GRIN waveguides are an existing technology and have been designed in a variety of ways, but a simple and approximate method based on the BPM, to be shown below, can be used for the same purpose. A proof regarding the design of GRIN waveguides can be useful in determining when a GRIN solution exists. The proof itself demonstrates a method for designing GRIN waveguides, but it can be useful in the design of beam shapers as well.

Motivated by questions regarding the mathematical existence of solutions for a general GRIN beam shaper, it can be useful to discuss the limitations of the eikonal and wave-based design methods that have been described above. For the eikonal-based design method, conditions under which a solution exists are well-defined. In previous work, it has been assumed that $Y(z,h)$ is a smooth function and there are no ray intersections. These conditions ensured that the wavefronts could be constructed unambiguously. For the wave-based design method (employing the BPM and phase retrieval), wavefronts need not be explicitly constructed, and the refractive index profile is found by an iterative process, rather than from a single equation.

A waveguide can be thought of as a beam shaper where the desired output field is the same as the input. For such a beam shaper, a purely real refractive index profile can be found which has the desired field as a mode of the GRIN medium. Since the index profile does not change with z, the beam-shaping problem can be reduced to a single axial step with length $\Delta z$. By considering the change to the phase and magnitude of the field due to propagation over a single step, it can be shown that the phase at any transverse position on the wave changes linearly with the step distance $\Delta z$, and the intensity changes quadratically with $\Delta z$. Therefore, in the continuous limit $\Delta z \to 0$, the change to the intensity vanishes, and the change in the field is phase-only. Since the refractive index operates only on the phase of the field, a refractive index profile exists that will cancel any change in the field as it propagates, according to Eqs. (4) and (5).

Consider the field at the axial position z=0 to be given by a purely real function, $a(x)$. If the field propagates forward by an axial distance $\Delta z$, the new field can be computed using the free-space transfer function $H(f)=\exp(-j\pi\lambda\Delta z f^2)$. The Fourier transform of the propagated field, $U(f)$, is thus given by $U(f)=A(f)H(f)$, where $A(f)$ is the Fourier transform of the input. Since $\Delta z$ can be made arbitrarily small, the argument of the complex exponential in $H(f)$ remains small at all finite $f$. Therefore, it is appropriate to write $H(f)\approx 1-j\pi\lambda\Delta z f^2$ in the limit of small $\Delta z$.

In this case, the Fourier transform of the propagated field can be written $U(f)=A(f)(1-j\pi\lambda\Delta z f^2)$. The inverse Fourier transform (denoted $F^{-1}\{\cdot\}$) then yields the propagated field in position space, $u(x)=a(x)-j\pi\lambda\Delta z \cdot F^{-1}\{A(f)f^2\}$. In other words, the output field is equal to the input field plus a small complex factor. The properties of $A(f)$ can be used to simplify this further. Since $a(x)$ is a real function, then $A(f)$ is symmetric. The product $A(f)f^2$ is also symmetric, meaning that $F^{-1}\{A(f)f^2\}$ is also a real function. In the following, this function is denoted $r(x)$.

The above discussion yields the expression for the output field $u(x)=a(x)-j\pi\lambda\Delta z \cdot r(x)$. Although $r(x)$ is unspecified, it is true generally that at any value of x for which $a(x)\neq 0$, there exists a $\Delta z$ value small enough that the second term becomes much smaller than the first. Without loss of generality, we consider the field at such a point, $x_0$, and write it in terms of its real and imaginary parts: $u(x_0)=p+jq$, where $p=a(x_0)$ and $q=-\pi\lambda\Delta z \cdot r(x_0)$. The magnitude of $u(x_0)$ is written $|u(x_0)|=(p^2+q^2)^{1/2}$, which can be approximated as $|u(x_0)|\approx p+q^2/(2p)$ for $q\ll p$. This quantity, expressing the magnitude of the field after propagation, is simply p, the original field magnitude, plus a factor proportional to $\Delta z^2$. The phase, on the other hand, is $\arg[u(x_0)]=a\tan(q/p)\approx q/p$, which is proportional to $\Delta z$. Thus, as $\Delta z \to 0$, the change in magnitude drops off more rapidly than the change in phase. This holds at all $x_0$ except where the field magnitude is zero, i.e. $a(x_0)=p=0$, since it is assumed that $q\ll p$.

The first point that can be gleaned from this proof is that a change in the phase profile naturally precedes a change in the magnitude profile for a collimated beam. Recalling that the input field is assumed to have a flat phase profile and therefore all of the rays describing it are parallel, it is intuitive that a change in phase precedes a change in intensity, since in the absence of diffraction, the field propagates forward with no change. This proof shows that the phase changes before the intensity during propagation if diffraction is taken into account.

A second point is that for any field with a flat wavefront, a purely real refractive index function exists which prevents the magnitude from changing. That is, by applying a phase profile opposite to the change that occurs naturally due to propagation, the phase that would otherwise accrue during propagation can be canceled entirely. Over the course of one step, the magnitude profile changes negligibly. In fact, the change can be made arbitrarily small by reducing $\Delta z$.

Figure 9:
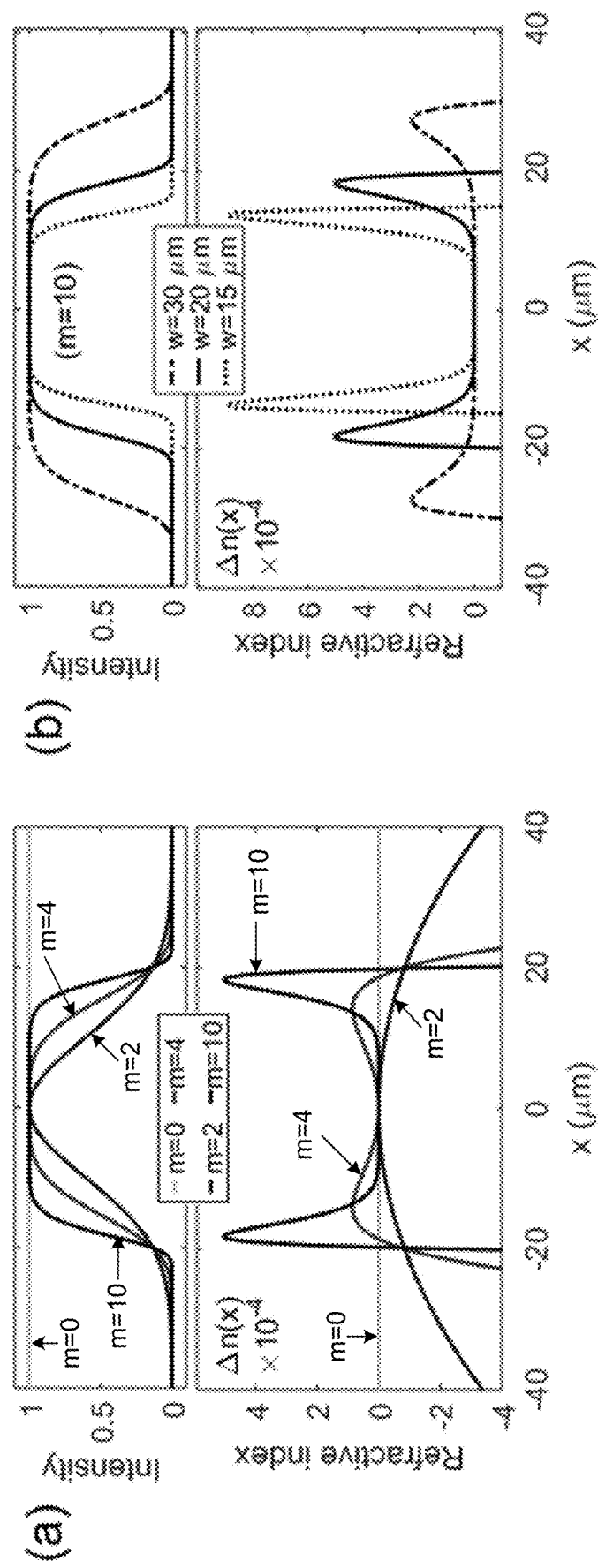
FIG. 9 shows intensity and refractive index profiles for mode fields of the form $u(x)=\exp[-(x/w)^m]$, with (a) varying exponential factor m, where $w=20$ μm, and (b) varying beam width w, where $m=10$. The background index value is $n_0=1.5$.

Third, the refractive index profile for a given mode can be computed numerically by propagating the field by a small distance $\Delta z$ and extracting the phase profile. The phase to be applied by the index profile is simply the phase of the propagated field, with opposite sign. Eq. (6) is used to convert the phase profile into a refractive index profile. FIG. 9 shows examples of refractive index profiles that are computed this way. (a) of FIG. 9 shows the result for a generalized Gaussian of the form $u(x)=\exp[-(x/w)^m]$, at different values for the parameter m. At m=0, the beam is a plane wave; at m=2 it is a Gaussian, and as $m\to\infty$, it approaches a flat-top. The refractive index profile is uniform for the special case m=0, since a plane wave is the propagation mode of a homogeneous medium, and the index profile is a quadratic function for m=2, in agreement with theory for lens-like media. In the cases where m>2, the refractive index profile has a lip at the edge of the beam, which grows taller as the beam becomes more sharply tapered. In (b) of FIG. 9, the calculated index profile is shown for beams with m=10 at different values of the beam width w. The lip in the refractive index profile grows taller as the beam becomes narrower, which is in agreement with calculations for step-index profiles that are meant to carry flat-top beams.

The index profile for a desired mode can also be computed directly from the Helmholtz equation. That is, $$\nabla^2 u(x) + k^2 n^2(x) u(x) = 0 \qquad (8)$$

is solved for the refractive index profile n(x), where u(x) is the complex field and k is the propagation constant. In Eq. (8), $\nabla^2 u$ becomes $d^2u/dx^2$ since $d^2u/dy^2=0$ for a 2D waveguide and $d^2u/dz^2=0$ for a mode of propagation (where x and y are the position in the two transverse directions). This direct approach to the wave equation produces the same solution as the small-step numerical method above, and it is delivered in a simple analytic form. But direct usage of the wave equation to design beam shapers is difficult for fields that are not modes of the medium. The situation at a particular z is considered. For complex u(x), imaginary terms enter the equation. Since a purely real n(x) is sought, both u(x) and n(x) must be chosen so the real and imaginary terms cancel. Such a solution may not exist in general. As a further complication, the term $d^2u/dz^2$ no longer vanishes. Variations of u with respect to z describe the field evolution, which in the methods above, can be provided without consideration to the wave equation. Therefore, as a consequence of choosing a particular field evolution, a real-valued index solution may not exist. These issues underscore the usefulness of the phase retrieval approach, which finds a purely real index profile while adapting itself to any pre-defined field evolution.

To proceed in finding n(x) using the wave equation rather than phase retrieval would forgo a degree of freedom that allows u(x) to have an arbitrary phase profile between each split propagation step. As mentioned above, the net phase applied by the refractive index profile at $z_{i+1}$, for instance, is $\varphi_{B,i}(x) + \varphi_{A,i+1}(x)$, but the phase of the field itself, $u_{i+1}(x)$, is arbitrary. Thus, the role of phase retrieval is to seek out modifications to the phase profiles of the prescribed field evolution that are attainable by a real index profile. In terms of the wave equation, this process seeks out modifications to $d^2u/dz^2$, via the phase of u(x,z), that causes all of the complex terms to cancel at each z step. Ultimately, it is this ability of phase retrieval to "repair" the prescribed field evolution that allows the refractive index profile for a highly accurate and efficient mode converter to be found, even when heuristic methods not based on the wave equation are used to produce the specified evolution.

Fabrication Methods for GRIN Devices

Whether fabrication is feasible for a GRIN design can be checked by calculating the maximum contrast and gradient of the refractive index. Both quantities depend on the width of the GRIN structure since the gradient becomes steep and monotonic at large |x|. A practical width can be chosen by the designer. The width of the GRIN channel can be designed to vary with z such that a small percentage of the beam energy lies outside it. This method was used in the examples shown above, where the energy fraction was 0.02%. This results in virtually no distortion of the propagated beam. For the mode converter of (a) of FIG. 6, this results in a maximum index contrast of $\Delta n \sim 1 \times 10^{-3}$ and a maximum gradient of $dn/dx \sim 0.4$ mm$^{-1}$. The beam-combining structure of (c) of FIG. 7 requires greater index contrast $\Delta n \sim 2.5 \times 10^{-2}$, and a similar maximum gradient $dn/dx \sim 0.2$ mm$^{-1}$. Based on these values, fabrication of the first device is possible with, e.g., either lithographic photopolymer methods or femtosecond laser direct writing, while the second device is compatible only with the former method due to the need for high index contrast in the second half of the GRIN profile.

The above numerical values apply to the particular examples shown here, but in general the contrast and gradient of the refractive index are sensitive to the size scale. In particular, the necessary index contrast shrinks as the length of the GRIN element increases. This is expected since the intensity remapping can then occur more gradually, and the necessary phase to achieve the transformation is applied over a greater length. In principle, the length of the GRIN element can be chosen to suit the given fabrication capabilities. This design flexibility emphasizes the advantage of the phase retrieval design method over the geometric method. As the device length increases, diffraction becomes more prominent and the geometric method becomes inaccurate, while the phase retrieval method continues to yield the desired beam shape.

The examples have shown that the phase retrieval method performs well in some cases that are challenging in a geometric approach. To start, the convenient cubic ray technique can put limitations on the phase profiles of the input and output fields. This is because ray intersections are avoided inside the GRIN element (in some implementations of the method). Intersections imply infinite local irradiance accompanied by sudden jumps in phase, both of which are unphysical. Whether ray intersections actually occur for a particular pairing of fields depends on the phase and intensity profiles. However, it is guaranteed that no intersections occur if both phase profiles are flat. In the examples above the flat-phase condition is obeyed. In some cases, the use of non-flat phase profiles is acceptable.

Figure 15:
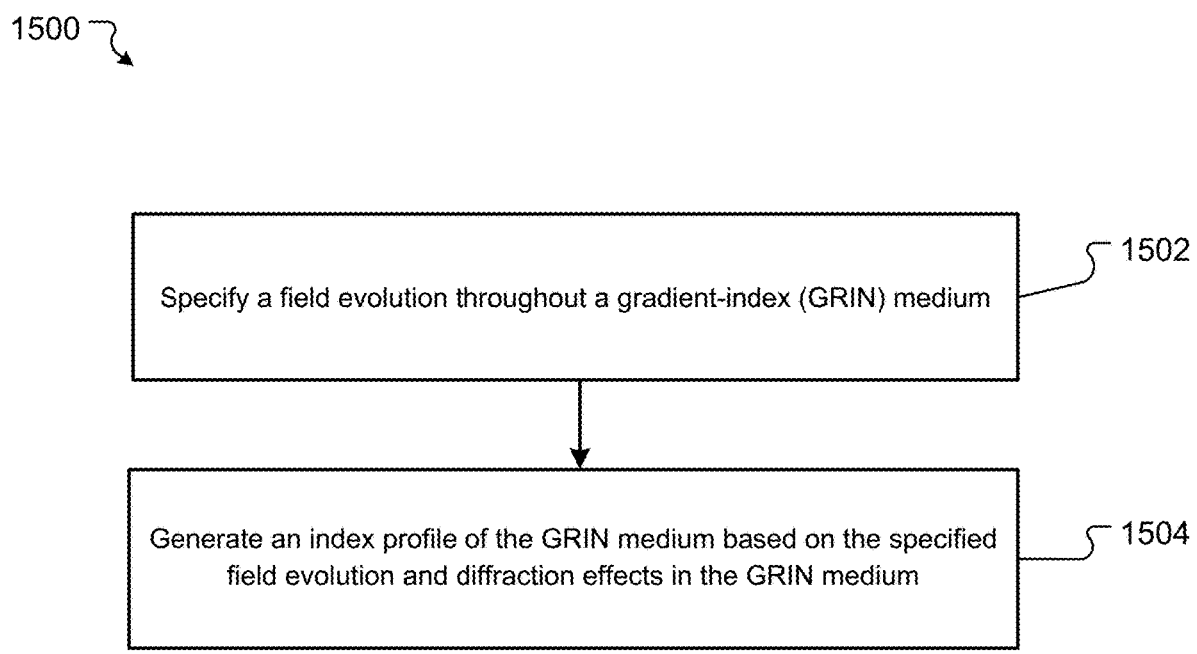
FIG. 15 shows a flowchart of an example process of managing beam shaping in a GRIN element.

Treating the design process as an index recovery problem is an approach that works quite generally. This allows the refractive index to be found from a given field evolution, regardless of how the field evolution was obtained. Consequently, changes made in one part of the approach have little bearing on the other. If a better strategy for defining the field evolution (step I) becomes available, it can be substituted without necessitating changes to the phase retrieval method (step II). These steps are illustrated in FIG. 15. Likewise, if a different propagation method is needed to improve accuracy at smaller size scales, the field evolution need not change unless it contains overlapping assumptions. Eq. (4), for instance, uses a slowly-varying envelope approximation. If a more precise propagation method is to be used, then Eq. (4) can be considered invalid and the wavefront can be constructed with a more general technique.

Although the scalar wave equation becomes less accurate at small size scales, the division of the inhomogeneous medium into a sequence of discrete phase elements per the BPM continues to be valid at smaller size scales and broader angular bandwidths. The BPM has been cast at many levels of approximation, including one that uses a fully vectorial Helmholtz equation. Better accuracy can be achieved under different conditions by switching to a version of the BPM that more rigorously follows the wave equation. Due to the separation between steps (I) and (II) in the design process, the overall approach does not change significantly, although the mathematical equations may be different.

Implementation of the present disclosure provides a GRIN design method for coherent beam shapers where diffraction is important. The GRIN volume is represented by a series of axially spaced phase elements which are found by phase retrieval given an arbitrarily-chosen field evolution. To produce the field evolution, a particularly simple ray mapping scheme is utilized. The method can be demonstrated by designing a GRIN beam shaper that performs a Gaussian to flat-top conversion. Coherent addition of three Gaussian beams can also be demonstrated in separate GRIN elements. The resulting designs perform better than ones developed using an approach based on the eikonal equation.

Implementation of the present disclosure provides two numerical methods that can be used to design GRIN profiles to address general beam shaping problems. A prescription for how the field profile evolves throughout the medium is specified in advance. Two methods for obtaining a field evolution include: first, interpolation of a set of ray trajectories following cubic polynomials, and second, using some non-ray-based specification of the magnitude evolution, from which the phase can be obtained in a later step. Once the complete field evolution has been written, the design problem is reduced to a computational problem which can be solved, for example, using the phase retrieval process described above. The refractive index solution depends on the propagation model that is used. A ray model using the eikonal equation is suitable for short GRIN elements and/or large beam sizes. In other cases, the wave-based design is more appropriate. Although the wave equation can be used directly to design an index profile that carries a specific mode of propagation, the problem of mode conversion is better addressed using phase retrieval. This is because phase retrieval makes corrections to the wavefronts in the pre-scribed field evolution to ensure a purely real refractive index. Both methods can be used to design highly efficient mode-converters or aperture-fillers that gradually convert a given field profile into a desired one.

Designing 3D GRIN Beam Shapers

The above descriptions are mainly directed to 2D devices where the electromagnetic field varies in one transverse dimension (x), and the refractive index varies in both directions within the plane (x, z). The next step toward realizing arbitrary GRIN devices, e.g., 3D GRIN devices, is to design index profiles where the field varies in both transverse dimensions (x, y), and the refractive index varies within the volume (x, y, z). For example, a coupling optic to go between disparate waveguide types, e.g., between fiber and on-chip rectangular waveguides, needs to work in three spatial dimensions. In the following, a more general approach is described to design 3D GRIN devices.

I. Designing Method for 3D GRIN Devices

A 3D design method is needed to realize beam shaping in both transverse directions or in three dimensions. Some aspects of the 2D design method can carry over to 3D, while others may be changed or modified. As described above, the 2D design strategy can have two main steps:
(I) Prescribing how the field evolves in the device throughout the GRIN region;
(II) Solving numerically for the index profile that causes the field to match the prescription.

The choice of propagation model affects the refractive index profile that is ultimately obtained. That is, the mathematics of Step (II) may change, depending on which effects of the wave equation are considered. In some cases, as described above, the GRIN design uses ray-based field propagation, where diffraction is considered negligible and the eikonal equation is used to solve for the index profile. In some cases, as described above, the GRIN design is based on scalar wave theory and split-step paraxial beam propagation, where the effects of diffraction are incorporated into the index profile by using phase retrieval to solve for the refractive index. Herein, although the changes from 2D to 3D may apply equally to both methods, the latter method, based on scalar wave theory and split-step propagation, is adopted to design 3D GRIN devices for illustration purposes.

Figure 10:
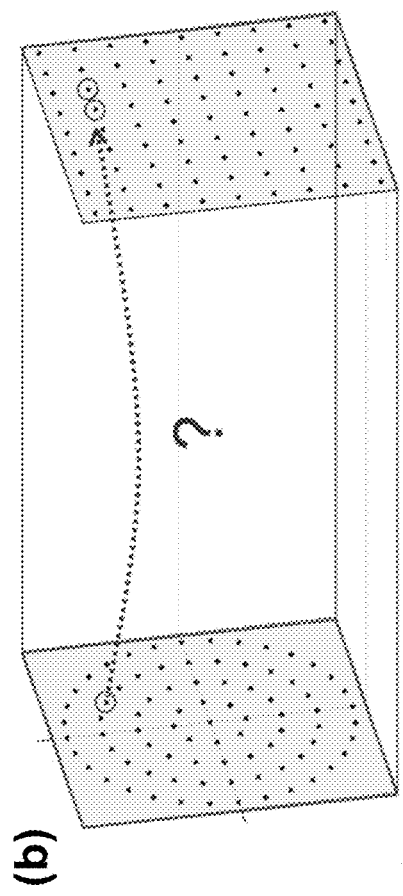
FIG. 10 shows dot diagrams illustrating ray correspondence between planes at two axial positions: (a) in two dimensions, the correspondence is unambiguous; (b) in three dimensions, it is not clear which ray dots should connect.
Figure 10:
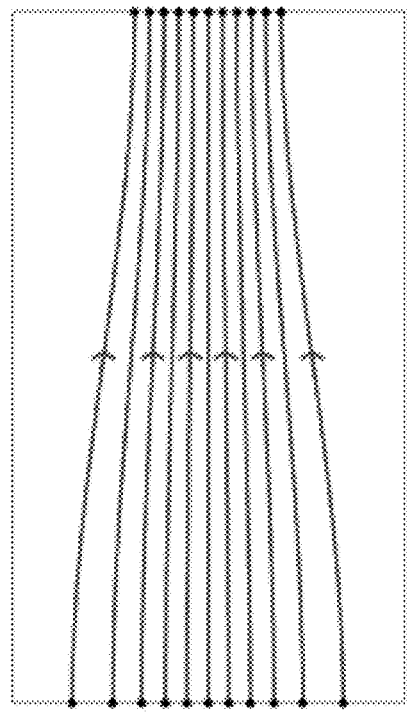

Several changes to Step (I) can be made to generalize to 3D. First, ray positions at an input plane need to be matched to those at an output plane, as illustrated in FIG. 10. By connecting dots between the two ray distributions at the input and output planes, the magnitude and wavefront information can be fully specified for the field throughout the GRIN region. In 2D, as illustrated in diagram (a) of FIG. 10 and as described above in FIG. 5, the correspondence between the dots at the input and output planes is unambiguous since the ray ordering is maintained from the input plane to the output plane. In 3D, as illustrated in diagram (b) of FIG. 10, it is not immediately obvious which rays correspond to one another. Since there is no ray ordering in 3D, a different strategy needs to be adopted to establish ray correspondence.

Instead of directly establishing correspondence between particular rays, a mapping function can be used to describe a distortion of the xy plane that converts a given ray distribution into another. For example, as illustrated in diagram (b) of FIG. 10, a circular distribution of rays (where each ray has radial position r and polar angle φ), can be converted to a square-shaped distribution (with Cartesian coordinates (a,b)) by use of the mapping function:

$$r=a, \varphi=\pi b/4a \qquad (9),$$

which applies to the upper quadrant, y>|x|, and similar relationships hold in the other quadrants.

Different mapping functions can be used to achieve other conversions, including Gaussian-to-uniform-circle, and uniform-square-to-supergaussian-square. By substituting the series of mapping functions into each other, one can obtain an overall mapping to convert a Gaussian distribution into a supergaussian square. The net transformation establishes a one-to-one correspondence between positions in the input plane and positions in the output plane. The region between the input and output planes can then be filled in by a set of ray trajectories. In some examples, these ray trajectories can be chosen arbitrarily to be cubic polynomials or any other functional form. For demonstration, the cubic form $$x(z)=A_x z^3 + B_x z^2 + C_x z + x_0$$

$$y(z)=A_y z^3 + B_y z^2 + C_y z + x_0 \qquad (10),$$

is used, which satisfies the boundary conditions implied by the magnitude and wavefront of the input and output fields on the input and output planes. Once the ray trajectories are chosen, the field evolution can be fully specified throughout the GRIN medium. Representing the field using a collection of rays in Step (I) will still account for the effects of diffraction when a wave propagation model is used in Step (II). The field specification originates from a ray representation in Step (I) means that Step (II) can solve for an index profile that compensates for diffraction rather than ignoring it. That is, diffraction effects can be incorporated into the refractive index in such a way that the wave-propagating field can match the ray-based specification.

A second challenge in generalizing to 3D is to compute the intensity profile at any axial position in the GRIN medium. The evolution of the field is fully specified by the ray trajectories, and the intensity profile can be reliably reconstructed on a coordinate mesh. In principle, the intensity at a given (x, y, z) position can be calculated from the local ray density, or the inverse distance between neighboring rays at the given surface. In 2D, rays at a particular z are spaced in one transverse dimension (x), so their densities are given by the distance to their nearest neighbor(s). However, in 3D, ray density is difficult to measure since a finite collection of rays does not provide information in every transverse direction. A straightforward approach can be to count the number of rays passing through a given area around the position of interest, but this may be slow to compute with a very large number of rays, or inaccurate with an insufficient number of rays.

In some implementations, given the distortion of space from the mapping function discussed above, the Jacobian as presented in equation (11) below is used to determine the intensity at a given (x,y,z) position:

$$J(x, y) = \begin{pmatrix} dx/dx_0 & dx/dy_0 \\ dy/dx_0 & dy/dy_0 \end{pmatrix}, \quad (11)$$

where x, y are the transverse coordinates at axial position $z_i$, and $x_0$, $y_0$ are the corresponding mapped coordinates at a reference axial position $z_0$. Since the Jacobian determinant gives the ratio of local areas, and intensity is inversely proportional to the local area, and the intensity profile in a mapped plane, $I(x,y)$, can be found from the input intensity $I(x_0,y_0)$ by $$I(x, y) = \frac{I(x_0, y_0)}{\det J(x, y)}. \quad (12)$$

Thus, the intensity at any (x, y) position in an intermediate axial position can be found if the corresponding position ($x_0$, $y_0$) at the input plane is known, along with the corresponding Jacobian. The net mapping function, which for the example below maps a Gaussian to square supergaussian, provides both pieces of information. The correspondence between a mesh position in the given plane and its generally off-mesh position in the input plane can found by Newton's method, and the entries of the Jacobian can be found numerically by applying small perturbations ($\delta x$, $\delta y$) to the input position and finding the corresponding changes in the mapped position, ($\delta x_0$, $\delta y_0$), to evaluate the derivatives. For example, the term $dx/dx_0$ appearing in the Jacobian (Eq. 11) can be approximated as $\delta x/\delta x_0$. Similar expressions are used for the other terms.

Two main aspects of the design method, including representation of the GRIN medium consistent with the BPM model, and the phase retrieval approach for computing the refractive index, can generalize to 3D. Modifications to the method can include specifying how the field evolves in the medium by use of mapping functions and using the Jacobian to calculate spatial correspondence and area distortion at intermediate axial positions.

II. Example: Conversion of 2D Gaussian into Square-Shaped Supergaussian

For illustration, the design method as described above is applied to design a 3D GRIN device for conversion of a 2D Gaussian beam into a square-shaped supergaussian. The design goal is to convert a Gaussian given by $I_{in}(x,y)=\exp[-2(x^2+y^2)/w_{in}^2]$ with $w_{in}=30$ μm to a supergaussian given by $I_{out}(x,y)=\exp[-2(x^{10}+y^{10})/w_{out}^{10}]$ with $w_{out}=50$ μm. The input and output fields are taken to have flat wavefronts, although this is not a requirement. The length of the GRIN element is 10 mm, which is divided into 100 increments of $\Delta z=0.1$ mm. The background refractive index is assumed to be 1.5.

First, the field evolution is prescribed. A mapping function is used to establish spatial correspondence between the input and output planes. Then the interior region is filled by ray trajectories with the form given in Eq. 10. The intensity profiles are then found by evaluating the Jacobian as a function of position x,y (Eq. 12) at each axial position. A subset of the resulting intensity profiles is shown in diagram (a) of FIG. 11. The wavefront is calculated in each plane based on the slopes of the ray trajectories.

Figure 11:
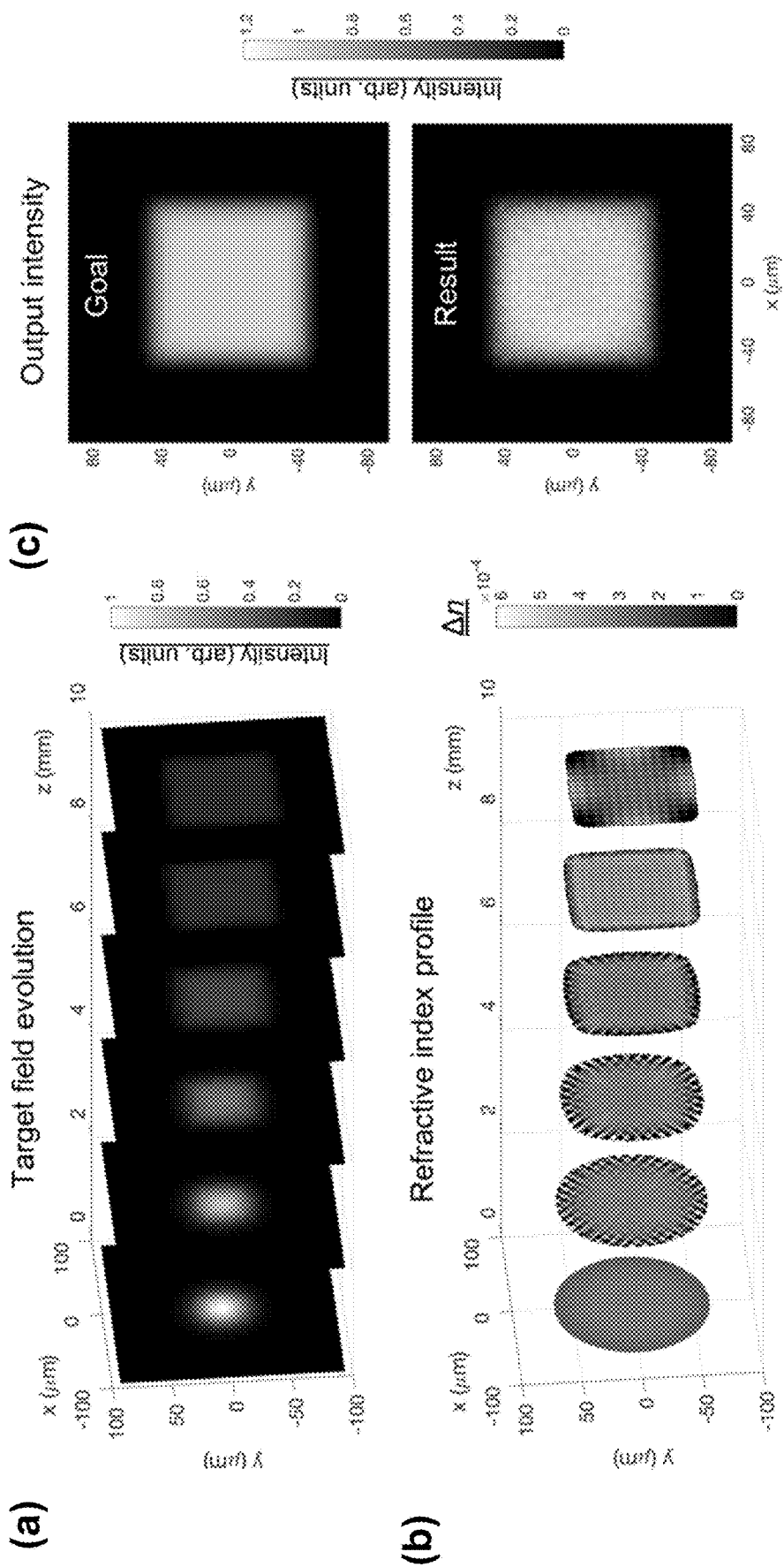
FIG. 11 shows 3D GRIN design for a Gaussian-to-square-supergaussian mode converter: (a) prescribed field evolution, (b) refractive index distribution found by phase retrieval, (c) intended output field and actual calculated output field.

Next, the phase retrieval algorithm (as described above, e.g., in FIGS. 3 and 4) is applied using information from the intensity profiles. This yields the modulation of the wavefront at each axial step that is needed to match the field prescription. It is related to the refractive index by Eq. (6). The resulting index profile at the given planes is shown in diagram (b) of FIG. 11. The main feature of the refractive index is the high-index peaks near the edges of the square and particularly at the four corners. These serve to confine the light and prevent deformations due to diffraction, as in a waveguide. The total range in refractive index is approximately $6 \times 10^{-4}$. Numerical artifacts, which appear as cosine-like ripples with occasionally strong peaks and troughs, are still apparent. The perimeter of the specified region at each axial position changes from a circle to a rounded square since the refractive index is specified in regions with significant intensity; the regions shown in FIG. 11 are above a 1% cutoff.

After finding the index profile by phase retrieval, the result is tested by propagating the input field through it using the split-step method. The propagated beam is shown in diagram (c) of FIG. 11. The desired supergaussian profile is shown on top, and the propagated beam is shown below. The beam has the desired square shape, a uniform center, and steep roll-off, but a significant amount of numerical noise is apparent. The noise may originate in interpolation error from reconstructing the intensity profiles in Step (I), leading to spurious frequencies in the phase retrieval solution that can be suppressed or eliminated by refining the design method.

Examples of Fabricating GRIN Beam Shapers

Fabrication methods for gradient-index (GRIN) optics, such as ion exchange or chemical vapor deposition, can produce high-quality optics at low cost, but can be limited to particular index gradients (e.g., Gaussian, Lorenztian, axial, cylindrical). These limitations can be circumvented somewhat by molding and surface shaping, but fully arbitrary index gradients are hard to achieve and hard to produce on-demand.

3D fabrication methods can be used to produce optical elements where the refractive index varies arbitrarily with position. Smooth gradients in refractive index can be written with sub-micron precision using methods including femto-second laser direct writing and liquid deposition photolithography (LDP). Whereas other fabrication methods have utilized metamaterial or photonic crystal structures to achieve a desired spatial distribution in effective index, the former methods modify the "actual" refractive index in a continuous manner.

Femtosecond laser writing utilizes multi-photon absorption to achieve a change in refractive index at the focal volume of a pulsed laser. The focused beam is scanned throughout the medium, writing a change in refractive index that depends on the laser power. By using a single scan point rather than a 2D projection, accidental exposure from stray or out-of-plane light is practically eliminated. The power utilized at every scan position can also be monitored during the write process. Laser writing systems are meant to produce single-mode index features, which is convenient for the fabrication of devices where single-mode behavior is desired in at least one direction. Glass (or photopolymer) can be used as the host material, so cutting and polishing of samples is straightforward. The multi-photon femtosecond laser writing method can be a good candidate for creating test optics because of its high degree of precision. Precise spatial control over the refractive index can be owed to the small focal volume of a writing beam, e.g., on an order of 1 micrometer (μm) in x, y, z, and the fact that the index features are written serially, enabling the applied dosage at each position to be tracked during fabrication. Continuously-graded refractive index features can be produced by adjusting the fluence in a continuous manner with position. The femtosecond laser writing method has been used to fabricate 2D devices such as the 2D GRIN beam shapers described above.

In the fabrication method called LDP, thin layers of a photopolymer and photoinitiator solution are exposed to UV (ultraviolet) light to build 3D index structures layer by layer. The change in index is produced partly by a diffusion process, enabling smooth index gradients to be made by smooth spatial variation in the UV exposures. The fabrication occurs on one mechanical platform, eliminating the need to transfer the sample for spin-coating and realignment with every layer, as in traditional lithography. In a particular process, a thin layer of liquid photopolymer coats the top of a platform that can move up and down. The liquid layer is exposed to a spatially-varying UV pattern (which may be continuous or discrete), causing the photopolymer to partially gel. In the gelled regions, a portion of the molecules have polymerized, reducing the concentration of liquid monomer. Hence, additional monomer molecules diffuse into the gelled regions, increasing the overall molecular density. After the diffusion process, the layer is flooded with UV, causing the remaining molecules to polymerize and turning the layer solid. After solidifying the layer, the moving platform moves down, a new liquid layer is flowed on top, and the process is repeated. Overall, it is a quasi-lithographic process in which 2D thin layers of varying refractive index (x,y) are created back to back. As the LDP method is faster and can produce devices of arbitrary size, it can be preferred over femtosecond laser writing for fabricating 3D devices at size scales of hundreds of microns or more, e.g., the 3D GRIN beam shapers described above.

While these fabrication methods can be used to make stand-alone optics, it may be desired to use them in integrated devices (on-chip). Femtosecond laser writing can be used if the host material is compatible (e.g., glass), and LDP or any other method could be used if the optics are going to be fabricated separately and dropped in place. In some cases, it may be desirable to make the device in silicon, or in other situations where the above methods may not be optimal. For instance, traditional lithography (with photoresist and various types of chemical deposition) can be used to create effective index profiles to achieve the effects of continuous gradients, although the structural elements have discrete values of refractive index.

For illustration purposes only, fabrication of a planar (2D) GRIN device using femtosecond laser writing, along with characterization of the device, is described in the following.

I. Fabricating a 2D GRIN Mode Converter

Converting a Gaussian beam to a flat-top is a classic problem in beam shaping, and it also has relevant applications. For example, in machining and medical uses, a uniform intensity profile reduces processing time and helps to avoid damage to surrounding material. For laser amplifiers, a flat-top mode is desirable to avoid nonlinear or thermal effects. A uniform intensity profile might be desired in integrated photonics, e.g., for components that are sensitive to optical power or temperature.

Figure 12A:
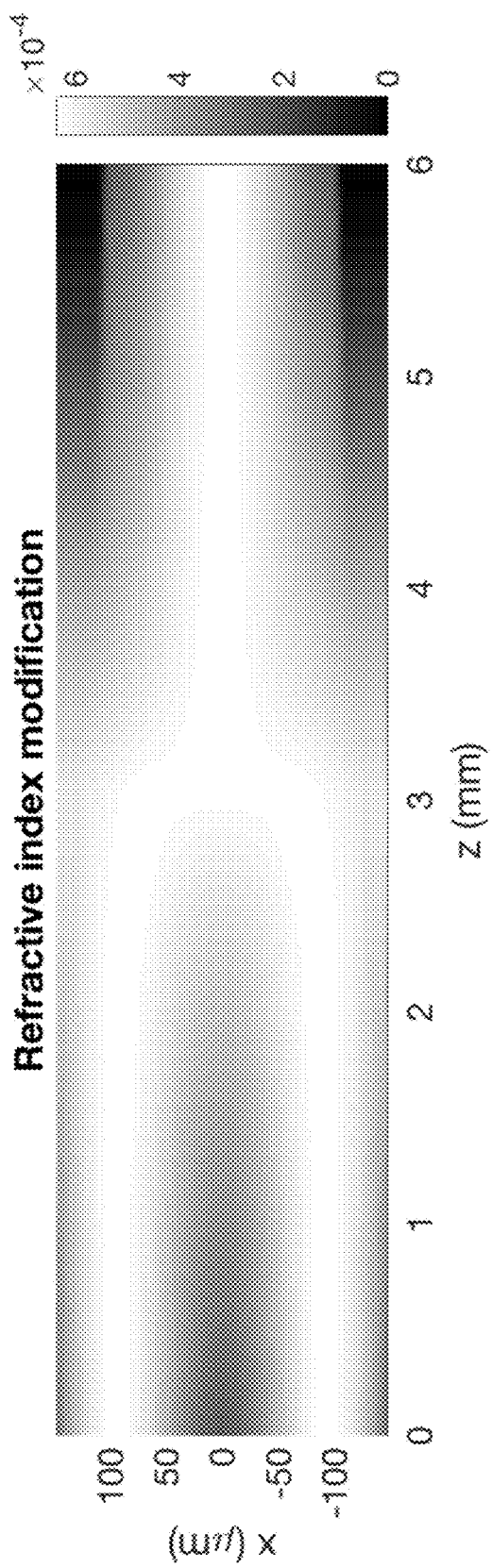
FIG. 12A shows a designed refractive index modification profile for a GRIN mode converter.

A GRIN mode converter that converts a Gaussian to a top-hat-like supergaussian in a single dimension was fabricated using femtosecond laser writing. The index profile is designed to transform a gaussian with the intensity profile $I_{in}(x)=\exp[-2(x/w_{in})^2]$ to a supergaussian with the intensity profile $I_{out}(x)=\exp[-2(x/w_{out})^{10}]$, where $w_{in}$, $w_{out}$ are the $1/e^2$ intensity half-width of the input beam and output beam, respectively. The widths of the beams and the length of the device are chosen so diffraction effects can be incorporated into the design to achieve an accurate mode conversion. The width of the written index region is 300 μm; the half-widths of the input and output beams are 80 μm and 100 μm, respectively. The full range of index modification is $0<\Delta n<7\times 10^{-4}$. FIG. 12A shows a designed refractive index modification profile (in the XZ plane) for the GRIN mode converter. The beam is single mode in the Y direction.

The GRIN device was fabricated using an ultrafast Ti:sapphire oscillator (Femtosource XL 500, Femtolasers GmbH) centered at 800 nm with 50 fs pulses. A pulse picker was used to reduce the repetition rate from 5.1 MHz to 255 kHz. The 3.9×3.4 mm laser beam was focused into a borosilicate sample (Schott Borofloat) using a 0.65 NA focusing objective. The sample was mounted on a set of Aerotech 3-axis air bearing translation stages, enabling the focal point to be moved inside the sample. At the focal region, nonlinear absorption causes localized melting which alters the molecular configuration and therefore the refractive index. Due to spherical aberrations, the focal region/index modification volume is elongated vertically to a cross sectional area of approximately 0.8×6.7 μm. The focused beam is then scanned at 15 mm/min to form an extended index modified region.

To fabricate large spatial regions of modified refractive index, a multi-scan technique was used. The focal point was scanned repeatedly in the axial direction of the device with a 0.4 μm offset between scan lines. The significant overlap between scan lines ensures that a smooth and continuous index profile is produced. The scale of the refractive index contrast was adjusted by modulating the pulse energy. Calibration measurements were made by measuring the refractive index modification of waveguides written at different pulse powers. A refractive index profilometer (Rinck Elektronik, Germany) was used to determine the width of the waveguides, and the effective index was calculated from measurements of the mode size. From this, the actual change in refractive index is deduced. During the write process, the pulse power was controlled by a variable attenuator so different pulse powers can be reached on demand.

Figure 12B:
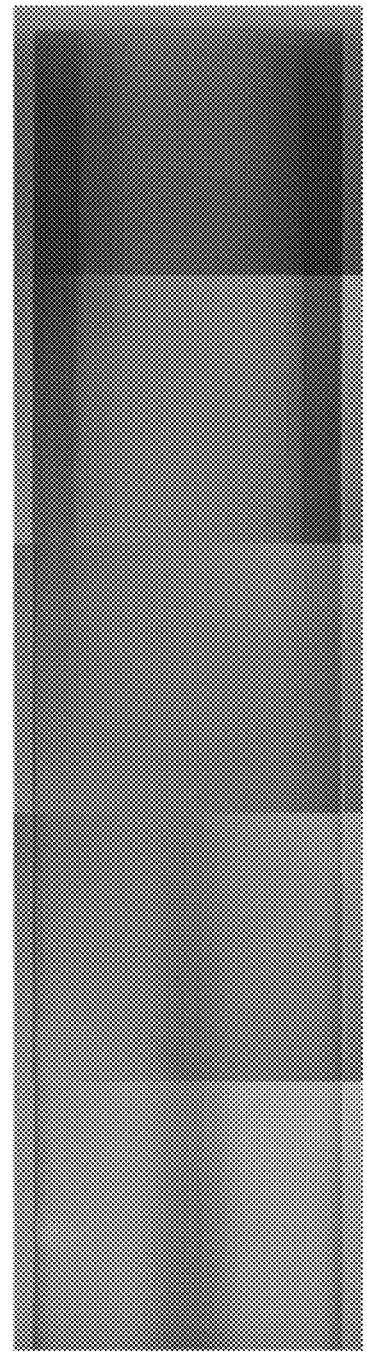
FIG. 12B shows a differential interference microscopy (DIC) image of a femtosecond laser-written GRIN mode converter.

A complete device of size 0.37×6 mm took approximately 6 hours to fabricate and was written using 927 horizontally overlapped scan lines. FIG. 12B shows a differential interference microscopy (DIC) image of such a device. The image contrast corresponds to the local refractive index gradient, with dark color shades corresponding to lower index. Five separate images were stitched together to create the complete FIG. 12B; the jumps in contrast along the horizontal direction are an artifact of the stitching. The direction of travel for the input beam is left to right. It is shown that smooth index gradients can be achieved in borosilicate glass by modulating the power of the writing laser to achieve different index modifications and overlapping neighboring scan lines to obtain gradual transitions from one index value to the next.

II. Characterizing Fabricated 2D GRIN Mode Converter

The fabricated 2D GRIN mode converter was characterized or tested by injecting an elliptical Gaussian beam into the GRIN mode converter and measuring the intensity profile at the output. When working properly, the output of the GRIN mode converter is expected to be supergaussian with a flat wavefront.

Figure 13:
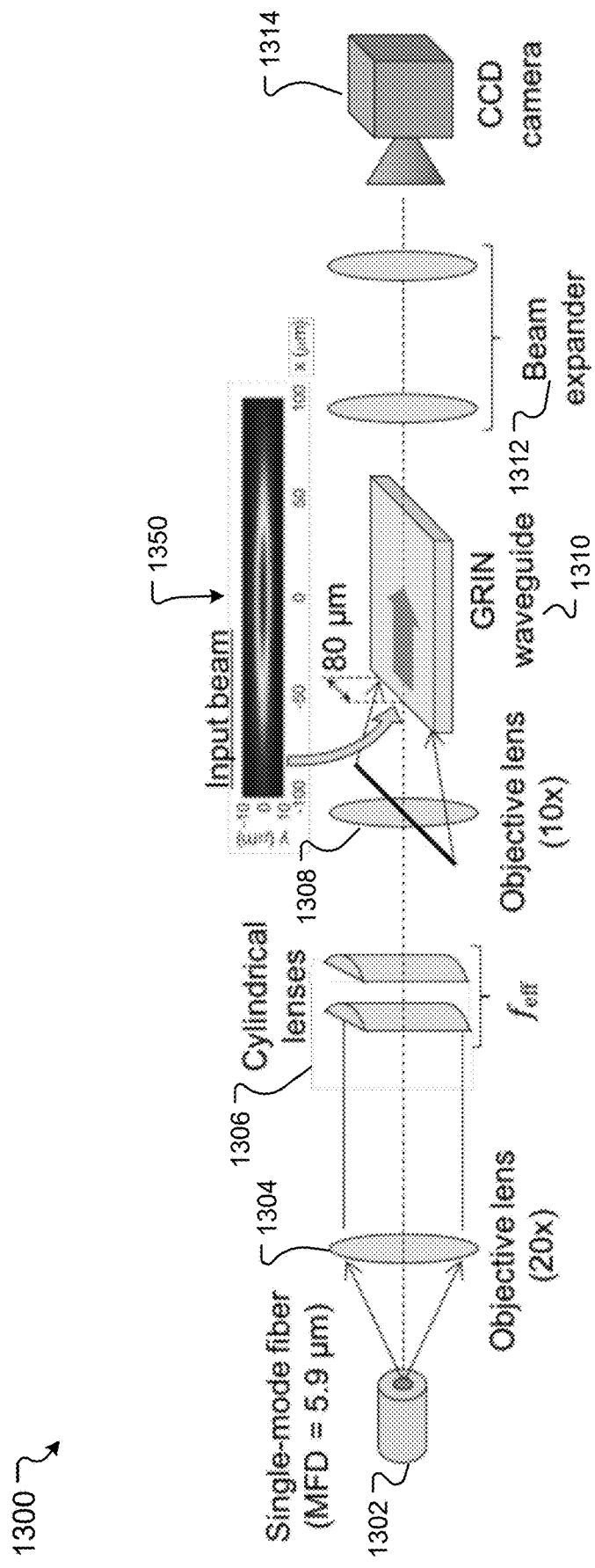
FIG. 13 shows a measurement setup for testing planar (or 2D) GRIN device, including coupling optics and a pair of cylindrical lenses to produce an elliptical Gaussian beam with the correct width and height. Inset: measured intensity profile of input beam (MFD: mode field diameter).

FIG. 13 shows a schematic diagram of a test setup 1300. The Gaussian beam originated from a fiber-coupled diode laser 1302 which has a single-mode fiber with 5.9 μm mode field diameter (MFD), ensuring high beam quality. The beam was collimated by a microscope objective (20×) 1304 and then focused in the horizontal direction by a pair of cylindrical lenses 1306 with a composite focal length $f_{eff}$=20.0 cm. Following this, the beam was reduced to a small size again by another microscope objective (10×) 1308 for a net magnification of roughly 30 in the horizontal direction and 2 in the vertical direction. The vertical magnification is chosen as such because it is the ratio of the full width of the GRIN mode (10.4 μm) to the mode-field diameter (MFD) of the fiber (5.9 μm).

After the microscope objective 1308, the beam was input into the fabricated GRIN mode converter (GRIN waveguide) 1310. The half width of the GRIN mode converter 1310 is about 80 μm. Inset diagram 1350 shows a measured intensity profile of the input beam, which has an elliptical shape. The output of the GRIN mode converter 1310 was measured by a CCD camera 1314 after passing through a beam expander 1312.

Figure 14:
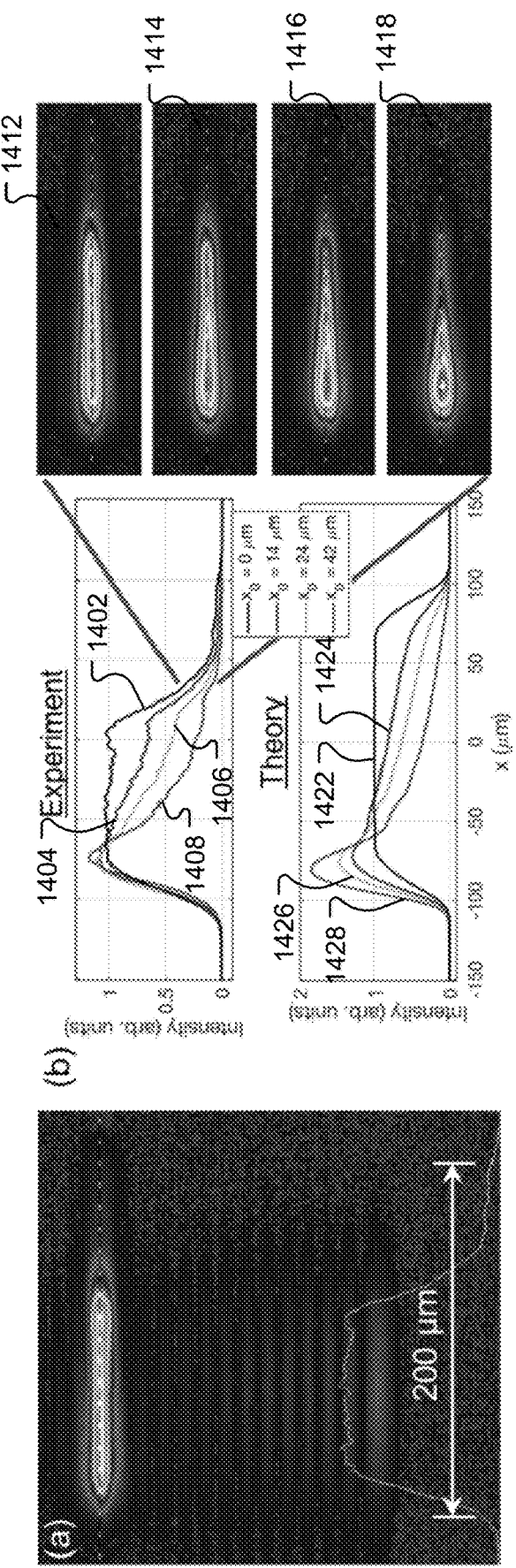
FIG. 14 shows output of the fabricated GRIN mode converter: (a) Output supergaussian; (b) Output beam as a function of horizontal shift misalignment of the input beam, $x_0$, with 2D images of the measured beams. Theory curves were normalized to the power in the experimental data.

Measurements of the output beam are shown in FIG. 14. A measurement with correct alignment is shown in diagram (a) of FIG. 14. The intensity is quite uniform in the center of the beam, and the skirt region on the left-hand side agrees with the desired supergaussian rolloff. The right-hand side of the beam is distorted; the uniform region tapers off too close to the center, which causes the full width of the beam to be less than the design width of 200 μm. This may signify that the GRIN mode converter 1310 locally failed to confine the mode in the vertical direction, which could be a consequence of lower-than-expected index modifications on that side of the device. This can be improved by achieving more consistent index values, e.g., by stabilizing the power of the writing laser for the duration of the long fabrication time.

The fabricated GRIN mode converter 1310 was further characterized by moving the injected beam slightly off center. This helps to confirm that the flat-top beam shape does not originate from a combination of spurious effects in the GRIN mode converter 1310. The output beam is shown in diagram (b) of FIG. 14 when the input beam is shifted to the left of center alignment at different $x_0$ positions. Numerical results are shown for comparison. The numerical results were calculated using split-step propagation through the designed index profile.

When $x_0$=0 μm, the intensity distribution of the output beam is shown in curve 1402 (along X direction) and 2D image 1412 (in XY plane), with corresponding numerical result curve 1422; when $x_0$=14 μm, the intensity distribution of the output beam is shown in curve 1404 (along X direction) and 2D image 1414 (in XY plane), with corresponding numerical result curve 1424; when $x_0$=24 μm, the intensity distribution of the output beam is shown in curve 1406 (along X direction) and 2D image 1416 (in XY plane), with corresponding numerical value curve 1426; when $x_0$=42 μm, the intensity distribution of the output beam is shown in curve 1408 (along X direction) and 2D image 1418 (in XY plane), with corresponding numerical value curve 1428.

The results show that the fabricated GRIN mode converter 1310 behaves as predicted by theory, with the power "bunching" to a peak in the direction of the shift, although the height of the peak is smaller. The fabrication process can be further improved to be reliable to fabricate devices that accurately transform the beam on both sides symmetrically with a correct width.

Example Process

FIG. 15 shows a flowchart of an example process 1500 of managing beam shaping in a GRIN medium.

A field evolution is specified throughout the GRIN medium (1502). The field evolution can be specified based on predetermined input and output complex fields of the GRIN medium.

In some implementations, the field evolution is specified by constructing the field evolution using a plurality of ray trajectories. Each of the ray trajectories can include a cubic polynomial trajectory. One or more polynomial coefficients of the cubic polynomial trajectory can be determined based on boundary conditions obtained from an axial position perpendicular to the ray trajectory and slope of rays at input and output planes. There is no ray intersection among the plurality of ray trajectories.

In some examples, a field at each axial position is determined based on the ray trajectories by converting the field from a ray-based presentation to a complex-valued scalar representation, where the field includes a magnitude and a phase. The magnitude can be determined by performing a magnitude conversion based on local field irradiance represented by ray density. The phase profile at a particular axial position can be determined by finding the wavefront from corresponding ray slopes.

In some implementations, the field evolution is specified by specifying an evolution of field magnitude using a non-ray-based algorithm, then converting the field magnitude into a plurality of ray trajectories, and deriving corresponding wavefronts from the plurality of ray trajectories.

In some implementations, the field evolution is specified by determining the field evolution based on predetermined input and output complex fields on respective input and output planes of the GRIN medium. The GRIN medium can be three-dimensional. A mapping function can be used to establish spatial correspondence between positions in the input plane and positions in the output plane, and the field evolution throughout the GRIN medium can be then constructed by using a plurality of ray trajectories that satisfy boundary conditions implied by magnitudes and wavefronts of the input and output complex fields on the input and output planes. An intensity profile of a mapped plane at an axial position between the input and output planes can be determined by evaluating the Jacobian as a function of position in the mapped plane at the axial position. A phase profile of the mapped plane at the axial position can be determined based on corresponding slopes of the ray trajectories at the axial position.

An index profile of the GRIN medium is generated based on the specified field evolution and light diffraction effects in the GRIN medium (1504). In some implementations, the index profile is computed using a plurality of homogenous propagation axial steps of length with corresponding phase elements between adjacent steps, for example, using a split-step beam propagation method (BPM). For each of the phase elements, a respective phase profile at a respective axial position of the phase element can be determined, and a respective index profile at the respective axial position of the phase element is generated based on the determined respective phase profile.

In some examples, the phase profile representing the net refractive index at each axial position is found from the specified field evolution using the methods described below. Specifically, the field magnitude information at the input and output of each axial propagation step can be used as constraints to determine the refractive index profile that is necessary to achieve them.

In some implementations, the index profile is generated by using a phase retrieval algorithm such as the Gerchberg-Saxton or input-output algorithm. Approximate wavefronts corresponding to the respective phase profile can be provided to the phase retrieval algorithm as an initial solution.

To derive the refractive index profile at each of the axial propagation steps, a split-step model can be adopted whereby each of many short steps are sandwiched by two corresponding adjacent phase elements representing the desired refractive index. The phase profiles on either end of a particular axial step are determined by the desired field magnitudes at the beginning and end of the step, as well as those immediately adjacent.

The GRIN medium can be configured to be a beam shaper or a beam combiner for combining multiple coherent beams. In some cases, the GRIN medium includes glass, and a maximum index contrast of the index profile of the GRIN medium is around $1 \times 10^{-3}$. In some cases, the GRIN medium includes a UV photopolymer or other polymer material, and a maximum index contrast of the index profile of the GRIN medium is larger, for example 0.1.

In some implementations, a GRIN element is designed according to the process 1500 and the designed GRIN element is fabricated by using at least one of fabrication techniques including: ion diffusion, femtosecond laser micromachining, layered photolithography, liquid deposition photolithography, lithographic direct-writing, photopolymer lithography, 3D printing, and additive fabrication.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, e.g., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Further modifications and alternative embodiments of various aspects will be apparent to those skilled in the art in view of this description. Accordingly, this description is to be construed as illustrative only. It is to be understood that the forms shown and described herein are to be taken as examples of embodiments. Elements and materials may be substituted for those illustrated and described herein, parts and processes may be reversed, and certain features may be utilized independently, all as would be apparent to one skilled in the art after having the benefit of this description.

What is claimed is:

1. A method performed by one or more processors, comprising:
    specifying a field evolution throughout a gradient-index (GRIN) medium;
    generating an index profile of the GRIN medium based on the specified field evolution and diffraction effects in the GRIN medium; and
    configuring a GRIN optical element based on the generated index profile of the GRIN medium,
    wherein generating the index profile of the GRIN medium comprises:
        representing electromagnetic (EM) field propagation in the GRIN medium by a plurality of axial propagation steps of nonzero length with corresponding phase elements between adjacent steps, wherein each of the phase elements is between two adjacent steps and at a respective axial position at ends of the steps.

2. The method of claim 1, wherein representing the electromagnetic field propagation in the GRIN medium comprises using a split-step beam propagation method (BPM).

3. The method of claim 1, wherein generating the index profile of the GRIN medium comprises:

for each of the phase elements, determining a respective phase modification profile of a field at the respective axial position of the phase element, the respective phase modification profile being a modification to a phase profile of the field through the phase element; and generating a respective index profile at the respective axial position of the phase element based on the determined respective phase modification profile.

4. The method of claim 3, wherein the phase element comprises a first side and a second, opposite side, and wherein determining the respective phase modification profile of the field at the respective axial position comprises:

determining a first complex field at the first side of the phase element and a second complex field at the second side of the phase element; and determining the respective phase modification profile based on the first complex field and the second complex field.

5. The method of claim 4, wherein the first complex field comprises a first phase profile and a first magnitude, and the second complex field comprises a second phase profile and a second magnitude, wherein the first magnitude is identical to the second magnitude, and wherein the respective phase modification profile at the respective axial position is determined based on a difference between the first phase profile and the second phase profile.

6. The method of claim 4, wherein determining the first complex field at the first side of the phase element comprises:

using the specified field evolution.

7. The method of claim 4, wherein determining the second complex field at the second side of the phase element comprises:

using a phase retrieval algorithm.

8. The method of claim 7, wherein the phase retrieval algorithm includes Gerchberg-Saxton method or input-output method.

9. The method of claim 7, wherein light propagation in the phase retrieval algorithm follows a split-step beam propagation method (BPM).

10. The method of claim 1, wherein there are two constituent phase elements at each respective axial position between two consecutive axial steps, wherein the method further comprises:

determining, based on the specified field evolution, first, second, and third complex fields at first, second, and third consecutive axial positions, a first axial step being between the first and second axial positions, a second, consecutive axial step being between the second and third axial positions; and determining, by using a phase retrieval algorithm, a first input field of the first axial step and a first output field of the first axial step based on the first and second complex fields and a second input field of the second axial step and a second output field of the second axial step based on the second and third complex fields.

11. The method of claim 10, further comprising:

determining a first phase modification profile of a first constituent phase element at the second axial position based on the first output field of the first axial step and the second complex field at the second axial position;

determining a second phase modification profile of a second, consecutive constituent phase element at the second axial position based on the second complex field at the second axial position and the second input field of the second axial step; and determining a sum of the first phase modification profile and the second phase modification profile to be a total phase modification profile at the second axial position, wherein generating an index profile of the GRIN medium comprises:

generating a respective index profile at the second axial position based on the total phase modification profile at the second axial position.

12. The method of claim 1, wherein specifying the field evolution comprises:

constructing the field evolution using a plurality of ray trajectories.

13. The method of claim 12, wherein each of the ray trajectories includes a cubic polynomial trajectory.

14. The method of claim 12, further comprising:

determining a field at each axial position based on the ray trajectories by converting the field from a ray-based presentation to a complex-valued scalar representation, wherein the field comprises a magnitude and a phase profile.

15. The method of claim 14, wherein determining the field comprises:

performing a magnitude conversion based on a local field irradiance from a ray density; and determining the phase profile from corresponding ray slopes at the axial position.

16. The method of claim 1, wherein specifying the field evolution comprises:

determining the field evolution based on predetermined input and output complex fields on respective input and output surfaces of the GRIN medium.

17. The method of claim 16, wherein determining the field evolution comprises:

establishing, by using a mapping function, spatial correspondence between positions in the input surface and positions in the output surface; and constructing the field evolution throughout the GRIN medium using a plurality of ray trajectories that satisfy boundary conditions implied by magnitudes and wavefronts of the input and output complex fields on the input and output surfaces.

18. The method of claim 17, further comprising:

determining an intensity profile of a mapped surface at an axial position between the input and output surfaces by evaluating a corresponding Jacobian determinant as a function of position in the mapped surface at the axial position.

19. The method of claim 17, further comprising:

determining a phase profile of a mapped surface at an axial position based on corresponding slopes of the ray trajectories at the axial position.

20. The method of claim 16, wherein the GRIN medium is three-dimensional.

21. The method of claim 1, wherein specifying the field evolution comprises:

specifying an evolution of field magnitude using a non-ray-based algorithm.

22. The method of claim 1, wherein the GRIN medium comprises glass, and a maximum index contrast of the index profile of the GRIN medium is about $1\times10^{-3}$.

23. The method of claim 1, wherein the GRIN medium comprises a polymer, and a maximum index contrast of the index profile of the GRIN medium is about 0.1.

24. A method performed by one or more processors, comprising:
- specifying a field evolution throughout a gradient-index (GRIN) medium, wherein the specifying the field evolution comprises constructing the field evolution using a plurality of ray trajectories;
- generating an index profile of the GRIN medium based on the specified field evolution and diffraction effects in the GRIN medium; and
- configuring a GRIN optical element based on the generated index profile of the GRIN medium; and
- determining one or more parameters of each of the ray trajectories based on boundary conditions obtained from a position on a surface intersected by the ray trajectory and slope of rays at input and output surfaces.

25. A method performed by one or more processors, comprising:
- specifying a field evolution throughout a gradient-index (GRIN) medium;
- generating an index profile of the GRIN medium based on the specified field evolution and diffraction effects in the GRIN medium; and
- configuring a GRIN optical element based on the generated index profile of the GRIN medium;
- wherein the GRIN medium is configured to be one of:
  - a device to perform at least one of irradiance redistribution and wavefront reshaping,
  - a combiner to combine multiple coherent, incoherent, or partially coherent beams,
  - an imaging device,
  - a cloaking device, and
  - a waveguide.

* * * * *